(12) United States Patent
Van Der Made et al.

(10) Patent No.: US 11,657,257 B2
(45) Date of Patent: *May 23, 2023

(54) SPIKING NEURAL NETWORK

(71) Applicant: BrainChip, Inc., Laguna Hills, CA (US)

(72) Inventors: Peter Aj Van Der Made, Perth (AU); Anil Shamrao Mankar, Mission Viejo, CA (US)

(73) Assignee: BrainChip, Inc., Laguna Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/962,082

(22) Filed: Oct. 7, 2022

(65) Prior Publication Data

US 2023/0026363 A1 Jan. 26, 2023

Related U.S. Application Data

(63) Continuation of application No. 16/670,368, filed on Oct. 31, 2019, now Pat. No. 11,468,299.

(Continued)

(51) Int. Cl.
*G06N 3/04* (2023.01)
*G06N 3/049* (2023.01)
*G06N 3/063* (2023.01)

(52) U.S. Cl.
CPC ............ *G06N 3/049* (2013.01); *G06N 3/063* (2013.01)

(58) Field of Classification Search
CPC ........ G06N 3/045; G06N 3/048; G06N 3/063; G06N 3/08
See application file for complete search history.

(56) References Cited

U.S. PATENT DOCUMENTS 11,468,299 B2 10/2022 van der Made et al.
2010/0312735 A1 12/2010 Knoblauch
(Continued)

FOREIGN PATENT DOCUMENTS

CN 104685516 A 6/2015
WO WO 2018/091706 A1 5/2018

OTHER PUBLICATIONS

International Search Report dated Jan. 22, 2020 for Appl. No. PCT/US2019/059032, 2 pages.
(Continued)

*Primary Examiner* — Brent Johnston Hoover
(74) *Attorney, Agent, or Firm* — Sterne, Kessler, Goldstein & Fox P.L.L.C.

(57) ABSTRACT

Disclosed herein are system, method, and computer program product embodiments for an improved spiking neural network (SNN) configured to learn and perform unsupervised extraction of features from an input stream. An embodiment operates by receiving a set of spike bits corresponding to a set synapses associated with a spiking neuron circuit. The embodiment applies a first logical AND function to a first spike bit in the set of spike bits and a first synaptic weight of a first synapse in the set of synapses. The embodiment increments a membrane potential value associated with the spiking neuron circuit based on the applying. The embodiment determines that the membrane potential value associated with the spiking neuron circuit reached a learning threshold value. The embodiment then performs a Spike Time Dependent Plasticity (STDP) learning function based on the determination that the membrane potential value of the spiking neuron circuit reached the learning threshold value.

14 Claims, 16 Drawing Sheets

Related U.S. Application Data

(60) Provisional application No. 62/754,348, filed on Nov. 1, 2018.

(56) References Cited

U.S. PATENT DOCUMENTS

| | | |
|---|---|---|
| 2012/0011093 A1 | 1/2012 | Aparin et al. |
| 2012/0259804 A1 | 10/2012 | Brezzo et al. |
| 2013/0325766 A1 | 12/2013 | Petre et al. |
| 2014/0052679 A1 | 2/2014 | Sinyavskiy et al. |
| 2014/0081895 A1 | 3/2014 | Coenen et al. |
| 2016/0224890 A1* | 8/2016 | Friedman ............... G11C 11/54 |
| 2016/0358067 A1 | 12/2016 | Brezzo et al. |
| 2018/0082176 A1 | 3/2018 | Wu et al. |
| 2018/0174023 A1 | 6/2018 | Imam et al. |
| 2018/0174042 A1 | 6/2018 | Srinivasa et al. |
| 2018/0174053 A1 | 6/2018 | Lin |
| 2018/0189645 A1 | 7/2018 | Chen et al. |
| 2018/0197075 A1 | 7/2018 | Modha |
| 2018/0225562 A1 | 8/2018 | van der Made |
| 2018/0322384 A1 | 11/2018 | Augustine et al. |
| 2019/0042909 A1* | 2/2019 | Sumbul ................... G06N 3/08 |
| 2019/0108434 A1 | 4/2019 | Wozniak et al. |
| 2019/0228285 A1 | 7/2019 | Zhang et al. |
| 2020/0218977 A1 | 7/2020 | Paul et al. |

OTHER PUBLICATIONS

Written Opinion dated Jan. 22, 2020 for Appl. No. PCT/US2019/059032, 6 pages.

Kreuzer, A. et al., "DEEP Extreme Scale Technologies", DEEP-EST Consortium Partners, Ref. Ares (2017)5332550—Oct. 31, 2017, DEEP-EST-754304, 80 pages.

Wu, J., et al., "Deep Spiking Neural Network with Spike Count based Learning Rule," 2019 International Joint Conference on Neural Networks, arxiv.org, published Feb. 15, 2019, URL: //https://arxiv.org/pdf/1902.05705.pdf, 6 pages.

Kheradpisheh, S.R., et al., "STDP-based spiking deep convolutional neural networks for object recognition," Neural Networks, arxiv.org, published Dec. 25, 2017, URL: http://arxiv.org/pdf/1611.01421.pdf, 21 pages.

European Extended Search Report for European Application No. EP19880608.5, European Patent Office, Munich, dated Jul. 6, 2022, 10 pages.

Lin et al., "Digital Spiking Neuron Cells for Real-Time Reconfigurable Learning Networks", Dec. 21, 2017, 2017 30th IEEE International System-on-Chip Conference (SOCC), pp. 163-168 (Year: 2017).

Lin et al., "Analysis and Simulation of Capacitor-Less ReRAM-Based Stochastic Neurons for the in-Memory Spiking Neural Network", Oct. 2018, IEEE Transactions on Biomedical Circuits and Systems, vol. 12, No. 5, pp. 1004-1017 (Year: 2018).

* cited by examiner

```
Name: SCNN_CIFAR10                                              1600
Path: ""
Layers:
  - Name: input                    ← 1602
    Parameters:
      input_height: 32
      input_width: 32
      input_features: 128
      Type: InputData
  - Name: scnn_conv2               ← 1604
    Parameters:
      Type: ConvolutionalTernary
      filetoload: Akida_CIFAR10_network/scnn_conv2_wts.dat
      BufferingType: FlushingBuffer
      num_output: 128
      packet_size: 131072
      kernel_height: 3
      kernel_width: 3
      pooling_dim: 2
      ConvolutionMode: same
  - Name: scnn_conv3               ← 1606
    Parameters:
      Type: ConvolutionalTernary
      filetoload: Akida_CIFAR10_network/scnn_conv3_wts.dat
      BufferingType: FlushingBuffer
      num_output: 256
      packet_size: 32768
      kernel_height: 3
      kernel_width: 3
      pooling_dim: 1
      ConvolutionMode: same
  - Name: scnn_conv4
```

FIG. 16

SPIKING NEURAL NETWORK

CROSS-REFERENCE TO RELATED APPLICATION(S)

This application is a continuation of U.S. patent application Ser. No. 16/670,368, filed on Oct. 31, 2019, which claims the benefit of U.S. Provisional Application No. 62/754,348, filed on Nov. 1, 2018, titled "An Improved Spiking Neural Network," all of which are hereby incorporated by reference in their entirety for all purposes.

FIELD

The present approach generally relates to neural circuit engineering and, more particularly, to a system and method for a low-power high density autonomous learning artificial neural network on a chip.

BACKGROUND

It has long been a goal for artificial neural networks to replicate the function of the biological neural network (the brain), with limited success. Brute force hardware approaches to the design of an artificial neural network have been cumbersome and inadequate, and fall far shown of the desired goal of replicating the functionality of the human brain. Thus, a need exists for an approach that enables an autonomous, reconfigurable spiking neural network to be realized that can scale to very large networks, yet fit on a chip while rapidly making inferences from a wide variety of possible input data and/or sensor sources.

SUMMARY

Provided herein are system, apparatus, article of manufacture, method and/or computer program product embodiments, and/or combinations and sub-combinations thereof, for an improved spiking neural network (SNN) configured to learn and perform unsupervised extraction of features from an input stream. Some embodiments include a neuromorphic integrated circuit comprising a spike converter, a reconfigurable neuron fabric, a memory, and a processor. The spike converter is configured to generate spikes from input data. The reconfigurable neuron fabric comprises a neural processor comprising a plurality of spiking neuron circuits. The spiking neuron circuits are configured to perform a task based on the spikes received from the spike converter and a neural network configuration. The memory comprises the neural network configuration which comprises a potential array and a plurality of synapses. The neural network configuration further defines connections between the plurality of spiking neuron circuits and the plurality of synapses. The processor is configured to modify the neural network configuration based on a configuration file.

Also described herein are embodiments for learning and performing unsupervised extraction of features from an input stream. Some embodiments operate to receive, at a spiking neuron circuit, a set of spike bits corresponding to a set of synapses. The spiking neuron circuit applies a logical AND function to a spike bit in the set of spike bits and a synaptic weight of a synapse in the set of synapses. The spiking neuron circuit increments a membrane potential value based on applying the logical AND function. A neural processor then determines that the membrane potential value associated with the spiking neuron circuit reached a learning threshold value. The neural processor then performs a Spike Time Dependent Plasticity (STDP) learning function based on the determination that the membrane potential value of the spiking neuron circuit reached the learning threshold value.

This Summary is provided merely for purposes of illustrating some example embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings are incorporated herein and form a part of the specification.

FIG. 8 illustrates a weight swapping step of the STDP learning method, according to some embodiments.

FIG. 9 illustrates a method of convolution used in a spiking convolutional neural processor, according to some embodiments.

FIG. 11 illustrates a symbolic representation of a convolution involving 2 channels of spikes, two 3 by 3 inverse convolution kernels, and resulting membrane potential values, according to some embodiments.

FIG. 12 illustrates the resulting spikes generated in neurons on channel 1 and channel 2 of FIG. 11, according to some embodiments.

FIG. 16 illustrates an example of a YAML configuration file, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
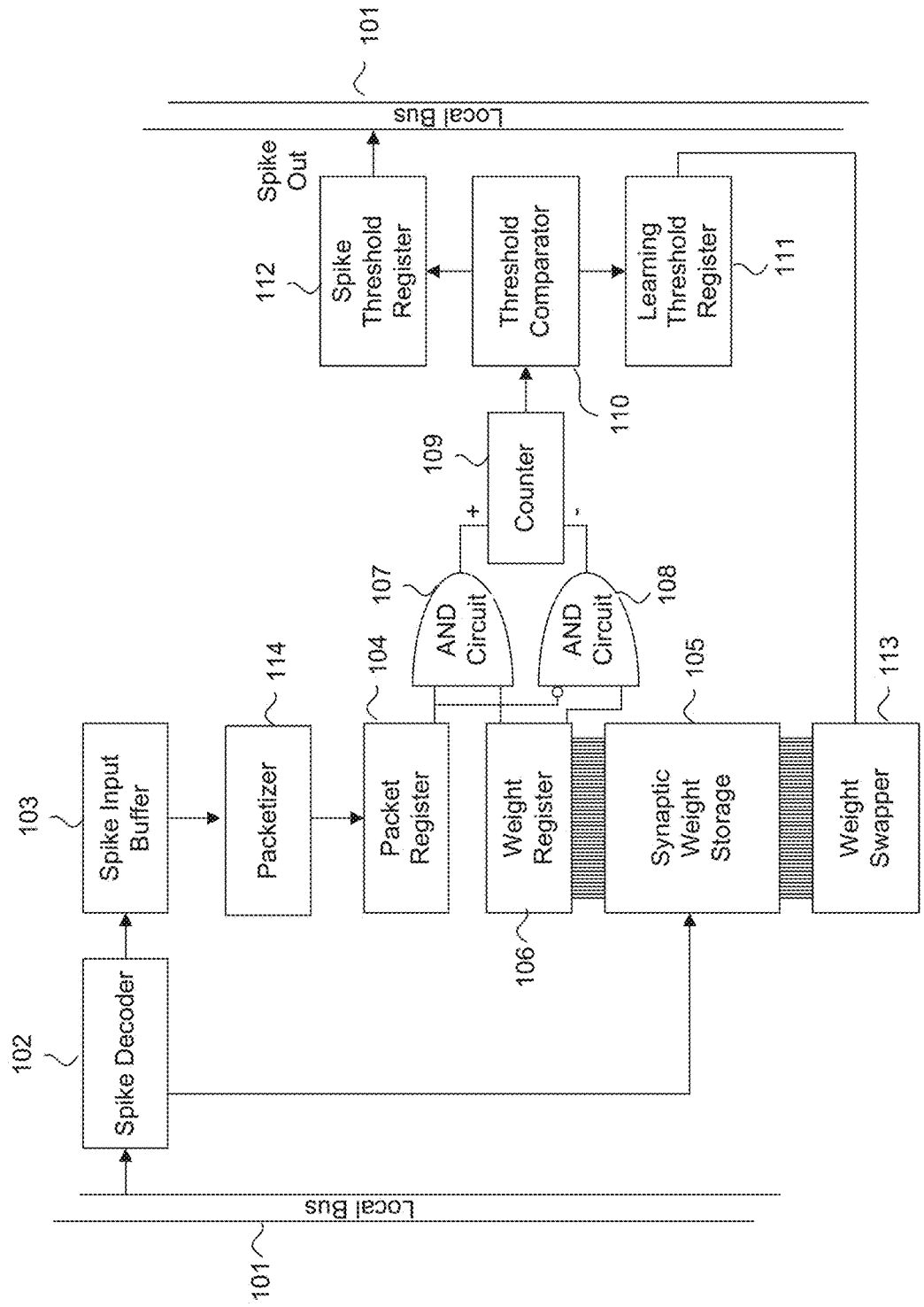
FIG. 1 is a block diagram of a neural model, according to some embodiments.

Provided herein are system, apparatus, device, method and/or computer program product embodiments, and/or combinations and sub-combinations thereof for an improved spiking neural network (SNN) configured to learn and perform unsupervised extraction of features from an input stream. Embodiments herein include a stand-alone neuromorphic integrated circuit providing an improved SNN. The neuromorphic integrated circuit provides several benefits. First, the neuromorphic integrated circuit is compact in size. For example, the neuromorphic integrated circuit integrates on a silicon die a processor complex, one or more sensor interfaces, one or more data interfaces, spike converters, and a memory. This enables efficient use of the silicon area in hardware implementations. Second, the neuromorphic integrated circuit can be reprogrammed for many different tasks using a user defined configuration file. For example, the connections between layers and neural processors in the neuromorphic integrated circuit can be reprogrammed using a user defined configuration file. Third, the neuromorphic integrated circuit provides low latency output. Fourth, the neuromorphic integrated circuit consumes a low amount of power consumption. For example, the neuromorphic integrated circuit can consume two orders of magnitude less power than a comparable artificial neural network (ANN) when performing the same task. Moreover, the neuromorphic integrated circuit can provide an accuracy that approaches or equals the state of the art. Finally, the neuromorphic integrated circuit provides an improved learning method that exhibits both built-in homeostasis and rapid convergence of synaptic weights to incoming data patterns.

ANNs generally consist of artificial neurons featuring an architecture that is determined at design time. The neurons can loosely model the neurons in a biological brain. The neurons can be hardware circuits or defined programmatically. The function of an ANN can be defined by connections between the neurons in a layer, connections between layers of neurons, synaptic weights, and the pre-processing of input data to fit a predefined input range.

In an ANN, inference can be performed using a multiply-accumulate (MAC) operation. In a MAC operation, incoming data values can be multiplied by a plurality of synaptic weights stored in a memory. For example, an ANN can perform many MAC operations (e.g., 156 million MAC operations) per image to classify an object in the image. The results of these multiplications can then be integrated by addition in each neuron in the network. After performing the MAC operation, a non-linear function can be applied to the integrated value of a neuron resulting in an output value. The output value can be a floating-point value.

Multiple layers can be used to create an ANN to perform a specific task. Many neurons can be used in parallel in each layer of the ANN. A pooling operation can also be performed between inference layers.

A Deep ANN can refer to a software or hardware implementation of an ANN with many layers. Deep ANNs can be very successful at image classification. For example, Deep ANNs have been very successful at image classification of images in ImageNet. ImageNet is a large collection of hand-labeled images.

Deep ANNs are founded on the belief that biological neurons communicate data through firing rates, e.g., the rate at which electrical impulses are received and generated by a neuron. The neurons in a Deep ANN can communicate in floating point or multi-bit integer numbers.

Convolutional neural networks (CNNs) are a class of Deep ANNs in which neurons are trained using many labeled examples to extract features that occur in dataset. For example, the dataset can be an image. CNNs can apply a convolution operation to the image. A convolution operation can act on a small section of the image and communicate a value indicating the occurrence of a feature in the image to the next layer in the CNN. The feature can be contained in a small rectangular area. This small rectangular can be programmatically moved around a larger input image. When a feature in the image matches the feature information stored in the synapse weights of a neuron, a value is sent to the next layer in the CNN. In CNNs, the synapse weights are shared between neurons that respond to similar features in different locations of the image. A neuron in a CNN can act as a filter for defined features. Training a CNN can be accomplished through a mathematical optimizing technique known as backpropagation.

While CNNs have been successful in detecting features and classifying images, they often suffer from several technological problems including high computational demands, catastrophic forgetfulness, and incorrect classification of adversarial samples. CNNs also suffer from high latency. While many-core processors and massive parallel processing can be used in CNNs to offset latency issues caused by high computational requirements, this often results in high power requirements for the CNN. For example, a CNN used to classify images in ImageNet can use as much as 2000 watts of power. This is because the CNN may have to employ a high-powered central processing unit (CPU) and one or more graphics processing units (GPUs) implemented on Peripheral Component Interconnect Express (PCIe) add-in boards.

SNNs can solve some of the technological problems associated with the CNNs. SNNs are based on the proposition in bio-medical research that biological neurons communicate data in the timing of pulses that are emitted by the sensory organs and between neural layers. The pulses are short bursts of energy referred to as spikes. SNNs are a class of ANNs in which information between neurons is expressed using spikes. The spikes can express information based on their timing and spatial distribution. Spiking neurons in a SNN may only spike, and consume electrical energy, when a series of events at the input is recognized as a previously learned sequence. This is similar to the processing that occurs in a biological brain. The technology to simulate brain function in a SNN and to achieve a result such as classification of objects in an image, or recognition of specific features in a stream of data, can be referred to as neuromorphic computing.

SNN can consume several orders of magnitude less power than other types of ANNs because a neuron in a SNN does not constantly process to perform the MAC requirements of ANNs. Rather, the neuron can consume power only when a spike occurs. In a SNN, a neural function can be emulated by adding a variable non-zero synaptic weight value to a simulated membrane potential value of the neuron every time an input spike is received. The simulated membrane potential value can then be compared to one or more thresholds. A spike can be generated when the membrane potential value of the neuron reaches or exceeds a threshold. SNN do not exhibit catastrophic forgetfulness and can continue learning after the SNN has been trained. Moreover, there is no evidence that SNNs suffer from incorrect classification due to adversarial samples.

But conventional SNNs can suffer from several technological problems. First, conventional SNNs are unable to switch between convolution and fully connected operation. For example, a conventional SNN may be configured at design time to use a fully-connected feedforward architecture to learn features and classify data. Embodiments herein (e.g., the neuromorphic integrated circuit) solve this technological problem by combining the features of a CNN and a SNN into a spiking convolutional neural network (SCNN) that can be configured to switch between a convolution operation or a fully-connected neural network function. The SCNN may also reduce the number of synapse weights for each neuron. This can also allow the SCNN to be deeper (e.g., have more layers) than a conventional SNN with fewer synapse weights for each neuron. Embodiments herein further improve the convolution operation by using a winner-take-all (WTA) approach for each neuron acting as a filter at particular position of the input space. This can improve the selectivity and invariance of the network. In other words, this can improve the accuracy of an inference operation.

Second, conventional SNNs are not reconfigurable. Embodiments herein solve this technological problem by allowing the connections between neurons and synapses of a SNN to be reprogrammed based on a user defined configuration. For example, the connections between layers and neural processors can be reprogrammed using a user defined configuration file.

Third, conventional SNNs do not provide buffering between different layers of the SNN. But buffering can allow for a time delay for passing output spikes to a next layer. Embodiments herein solve this technological problem by adding input spike buffers and output spike buffers between layers of a SCNN.

Fourth, conventional SNNs do not support synapse weight sharing. Embodiments herein solve this technological problem by allowing kernels of a SCNN to share synapse weights when performing convolution. This can reduce memory requirements of the SCNN.

Fifth, conventional SNNs often use 1-bit synapse weights. But the use of 1-bit synapse weights does not provide a way to inhibit connections. Embodiments herein solve this technological problem by using ternary synapse weights. For example, embodiments herein can use two-bit synapse weights. These ternary synapse weights can have positive, zero, or negative values. The use of negative weights can provide a way to inhibit connections which can improve selectivity. In other words, this can improve the accuracy of an inference operation.

Sixth, conventional SNNs do not perform pooling. This results in increased memory requirements for conventional SNNs. Embodiments herein solve this technological problem by performing pooling on previous layer outputs. For example, embodiments herein can perform pooling on a potential array outputted by a previous layer. This pooling operation reduces the dimensionality of the potential array while retaining the most important information.

Seventh, conventional SNN often store spikes in a bit array. Embodiments herein provide an improved way to represent and process spikes. For example, embodiments herein can use a connection list instead of bit array. This connection list is optimized such that each input layer neuron has a set of offset indexes that it must update. This enables embodiments herein to only have to consider a single connection list to update all the membrane potential values of connected neurons in the current layer.

Eighth, conventional SNNs often process spike by spike. In contrast, embodiments herein can process packets of spikes. This can cause the potential array to be updated as soon as a spike is processed. This can allow for greater hardware parallelization.

Finally, conventional SNNs do not provide a way to import learning (e.g., synapse weights) from an external source. For example, SNNs do not provide a way to import learning performed offline using backpropagation. Embodiments herein solve this technological problem by allowing a user to import learning performed offline into the neuromorphic integrated circuit.

In some embodiments, a SCNN can include one or more neural processors. Each neural processor can be interconnected through a reprogrammable fabric. Each neural processor can be reconfigurable. Each neuron processor can be configured to perform either convolution or classification in fully connected layers Each neural processor can include a plurality of neurons and a plurality of synapses. The neurons can be simplified Integrate and Fire (I&F) neurons. The neurons and synapses can be interconnected through the reprogrammable fabric. Each neuron of the neural processor can be implemented in hardware or software. A neuron implemented in hardware can be referred to as a neuron circuit.

In some embodiments, each neuron can use an increment or decrement function to set the membrane potential value of the neuron. This can be more efficient than using an addition function of a conventional I&F neuron.

In some embodiments, a SCNN can use different learning functions. For example, a SCNN can use a STDP learning function. In some other embodiments, the SCNN can implement an improved version of the STDP learning function using synapse weight swapping. This improved STDP learning function can offer built-in homeostasis (e.g., stable learned weights) and improved efficiency.

In some embodiments, an input to a SCNN is derived from an audio stream. An Analog to Digital (A/D) converter can convert the audio stream to digital data. The A/D converter can output the digital data in the form of Pulse Code Modulation (PCM) data. A data to spike converter can convert the digital data to a series of spatially and temporally distributed spikes representing the spectrum of the audio stream.

In some embodiments, an input to a SCNN is derived from a video stream. The A/D converter can convert the video stream to digital data. For example, the A/D converter can convert the video stream to pixel information in which the intensity of each pixel is expressed as a digital value. A digital camera can provide such pixel information. For example, the digital camera can provide pixel information in the form of three 8-bit values for red, green and blue pixels. The pixel information can be captured and stored in memory. The data to spike converter can convert the pixel information to spatially and temporally distributed spikes by means of sensory neurons that simulate the actions of the human visual tract.

In some embodiments, an input to a SCNN is derived from data in the shape of binary values. The data to spike converter can convert the data in the shape of binary values to spikes by means of Gaussian receptive fields. As would be appreciated by a person of ordinary skill in the art, the data to spike convert can convert the data in the shape of binary values to spikes by other means.

In some embodiments, a digital vision sensor (e.g., a Dynamic Vision Sensor (DVS) from supplied by iniVation AG or other manufacture) is connected to a spike input interface of a SCNN. The digital vision sensor can transmit pixel event information in the form of spikes. The digital vision sensor can encode the spikes over an Address-event representation (AER) bus. Pixel events can occur when a pixel is increased or decreased in intensity.

In some embodiments, an input format of a SCNN is in the shape of spatial and temporal distributed spikes. A spike can be defined as a short burst of electrical energy.

In some embodiments, a SCNN can consist of one or more layers of spiking neurons. Spiking neurons can simulate the function of neurons. The spiking neurons can be interconnected through circuits that simulate the function of synapses.

A spiking neuron can be implemented in hardware or software. A hardware implemented spiking neuron can be referred to as a spiking neuron circuit. However, as would be appreciated by a person of ordinary skill in the art, a software implemented spiking neuron can be used in place of a spiking neuron circuit in any embodiment herein.

In some embodiments, a SCNN can be configured from a stored configuration. The stored configuration can be modified using a YAML Ain't Markup Language (YAML) file. The YAML file can define the function of components in a neural fabric to form a SCNN directed to a specific task. For example, a YAML file can configure the SCNN to classify images in the Canadian Institute For Advanced Research 10 (CIFAR-10) dataset (a collection of images that are commonly used to train machine learning and computer vision algorithms).

In some embodiments, each layer in a SCNN can be defined, connected, and configured as a convolutional layer with max pooling and shared synapse weights, or as a fully connected layer with individual synapses.

In some embodiments, convolutional layers can be used in combination with one or more max pooling layers in dimensionality reduction of an input signal by extracting certain features and communicating those features as metadata to the next layer in a SCNN. The metadata passed by each neuron can be in the form of the neuron membrane potential value or a spike. A spike can indicate that a threshold value has been reached. The spike can either trigger a learning event or an output spike. A neuron membrane potential value is a potential value of a neuron. The neuron membrane potential value can be read independently of thresholds.

In some embodiments, convolutional network layers in a SCNN can include a plurality of spiking neuron circuits. Each spiking neuron circuit can include an integrator and a plurality of synapses that are shared with other neurons in the layer. Each spiking neuron circuit can be configured as a feature detector. A convolutional layer can be immediately followed by a pooling layer. A pooling layer can be max-pooling layer, an average pooling layer, or another type of pooling layer as would be appreciated by a person of ordinary skill in the art. A max-pooling layer can receive the output of the spiking neuron circuits (e.g., feature detectors). The max-pooling layer can pass on to the next layer only the neuron output (e.g., neuron membrane potential value or a spike) with the highest potential value. An average pooling can perform a down-sampling by dividing the input into rectangular pooling regions and computing the average values of each region.

In some embodiments, fully connected layers in a SCNN can be used in classification, autonomous feature learning, and feature extraction. A fully connected layer can include a plurality of spiking neuron circuits. Each spiking neuron circuit can include an integrator and a plurality of synapses. The plurality of synapses may not be shared with other neuron circuits in the fully connected layer.

In some embodiments, learning in a SCNN can take place through a method known as Spike Timing Dependent Plasticity (STDP). In STDP learning, an input spike that precedes an output spike indicates the input spike contributed to the output spike. In STDP, this can causes the synapse weight to be strengthened.

In some embodiments, the STDP learning method is improved using synapse weight swapping. Synaptic weight values can be swapped across synapses to reinforce the synaptic inputs that contributed to output spike events and to weaken the synapses that did not contribute. This can cause the spiking neuron circuit to become increasingly more selective to a specific input feature.

In some embodiments, the STDP learning method is further improved using tertiary synapse weights. Tertiary synapse weights can have positive, zero, or negative values. Synapses that store positive weights can be referred to as excitatory synapses. Synapses that store negative weights can be referred to as inhibitory synapses. Synapses that store zero weights may not contribute to the selection process.

In some embodiments, an spike input buffer exists at the input of each layer of the neural network. An spike input buffer can receive and stores spike information. The spike information can be transmitted to the spike input buffer as digital bits. The presence of a spike can be represented using a '1'. The absence of a spike can be represented using a '0'.

In some embodiments, a packetizer can sort the spikes in the spike input buffer into one or more spike packets. A spike packet can be stored in a packet register.

In some embodiments, a first logical AND function can be applied to the bit pattern stored in the packet register and the positive weight bits stored in the synapses. A logical '1' at the output of the first logical AND function increments the membrane potential counter of the spiking neuron circuit. A second AND function can be applied to the bit pattern stored in the input spike buffer and the inverted negative weight bits in the synapses. A logical '1' at the output of the second logical AND function decrements the membrane potential counter of the spiking neuron circuit.

In some embodiments, a layer in a SCNN is collection of neurons that share parameters. The layer can receive spike information from previous layers and propagate the spike information to subsequent layers.

In some embodiments, a SCNN can support a feed-forward and feed-back architecture. This can be a connection topology where each layer receives inputs from a local bus structure and passes outputs to the same local bus.

In some embodiments, each layer can receive and transmit address-event representation (AER) style data structures that contain a header and event addresses. This information can be received into a spike input buffer. An AER event contains three components: x, y, f, where f is the feature (e.g., channel) and x, y are the coordinates of the spiking neuron circuit that spiked. The input spike buffer can be processed to create a spike packet that is processed by the layer. The layer can output a spike to an output spike buffer to the next layer for processing.

In some embodiments, all layer types that are not of an input layer type can have a potential array. The potential array can store the membrane potential values of each spiking neuron circuit.

In some embodiments, each layer can include two data structures that describe the connectivity between spiking neuron circuits in the layer and the inputs to the neurons. The first data structure can be referred to as a connection list array. Entries in the connection list array can correspond to a list of spiking neuron circuits to which a specific input is connected. The connection list array can contain connectivity information from source to destination.

The second data structure can be referred to as a weight vector array. Each entry in the weight vector array corresponds to a vector of inputs to which a specific spiking neuron circuit is connected. The weight vector array can contain destination to source information.

In some embodiments, each spiking neuron circuit in a fully connected layer type has a single entry in the potential array. In contrast, in some embodiments, the spiking neuron circuits of a convolution layer can share a single set of synaptic weights that is applied to x-y coordinates across every input channel. The synaptic weight can be stored in destination to source format in the weight vector array.

In ANNs with computationally derived neuron functions (e.g., Deep Learning Neural Networks (DNN), training and inference can be two separate operations that take place in different environments or machines. During a training phase, a DNN learns from a large training data set by computing the synaptic weight values in the neural network by means of back-propagation. In contrast, learning may not take place during an inference phase of the DNN.

In some embodiments, a SCNN makes no clear division between training and inference operations. The inference operation can operate through event propagation. Event propagation can refer to the processing of inputs by a layer of the SCNN to update the potential array and generate an output spike buffer of spikes that fire for the layer. The spiking neuron circuits in a layer can first perform the event propagation step (e.g., inference) and then the learning step. In some embodiments, when learning is disabled in a layer of the SCNN, the layer may only perform the event propagation step which is effectively the inference phase.

In some embodiments involving convolution, spiking neuron circuits can share synaptic weights. These neuron circuits can be referred to as filters. This is because these spiking neuron circuits can filter a specific feature from an input stream.

FIG. 1 is a block diagram of a neural network model, according to some embodiments. In FIG. 1, spikes can be communicated over a local bus 101. For example, local bus 101 can be a network on a chip (NoC) bus. The spikes can be communicated in the form of network packets. A network packet can contain one or more spikes and a code indicating origin and destination addresses.

In FIG. 1, spike decoder 102 can decode spikes in the network packets. Spike decoder circuit 102 can send a spike to a specific spiking neuron circuit based on an origin address in the network packet. For example, spike decoder circuit 102 can store the spike in the spike input buffer 103 of the corresponding spiking neuron circuit. Spike decoder circuit 102 can also store in the spike input buffer 103 of the corresponding neuron circuit the address where the bit is going to finish up at.

Spike input buffer 103 can store one or more spikes. A '1' bit can represent the presence of a spike and a zero bit can represent the absence of a spike. Spike input buffer 103 can also contain an address where a bit is going to finish up at.

In FIG. 1, packetizer 114 can sort the spikes in spike input buffer 103 into one or more spike packets. A spike packet can be stored in packet register 104. For example, in the case where a spiking neuron circuit has 1024 synapses, packet register 104 can be 1024 bits long. Packetizer 114 can sort the bits in spike input buffer 103 into the correct positions along the 1024 bit packet register 104. This sorting process is further described in FIG. 6.

In FIG. 1, synaptic weight values can be stored in synaptic weight storage 105. In some embodiments, synaptic weight storage 105 can be implemented using static random-access memory (SRAM). As would be appreciated by a person of ordinary skill in the art, synaptic weight storage 105 can be implemented using various other memory technologies.

Synaptic weight values in synaptic weight storage 105 can be positive or negative. In some embodiments, synaptic weight values in synaptic weight storage 105 can be transferred into weights register 106 for processing. The positive synaptic weight values in weights register 106 can be ANDed in logical AND circuit 107 with corresponding bits in packet register 104. The resulting output of logical AND circuit 107 can increment counter 109 for each positive result of the AND function. Counter 109 can represent the membrane potential value of a neuron.

The negative synaptic weight values in the weights register 106 can be ANDed in logical AND circuit 108 with corresponding bits in packet register 104. The resulting output of logical AND circuit 108 can decrement the counter 109. This process can be continued until all bits in packet register 104 have been processed.

After all bits in packet register 104 have been processed, counter 109 can contain a value that is representative of the number of bits in packet register 104 that correspond to positive and negative synaptic weight values in weights register 106. The value in counter 109 can be compared to at least one threshold using threshold comparator 110.

In some embodiments, threshold comparator 110 can compare the value in counter 109 to two thresholds. For example, threshold comparator circuit 110 can compare the value in counter 109 to a value in learning threshold register 111 and a value in spiking threshold register 112.

Figures 8, 9:
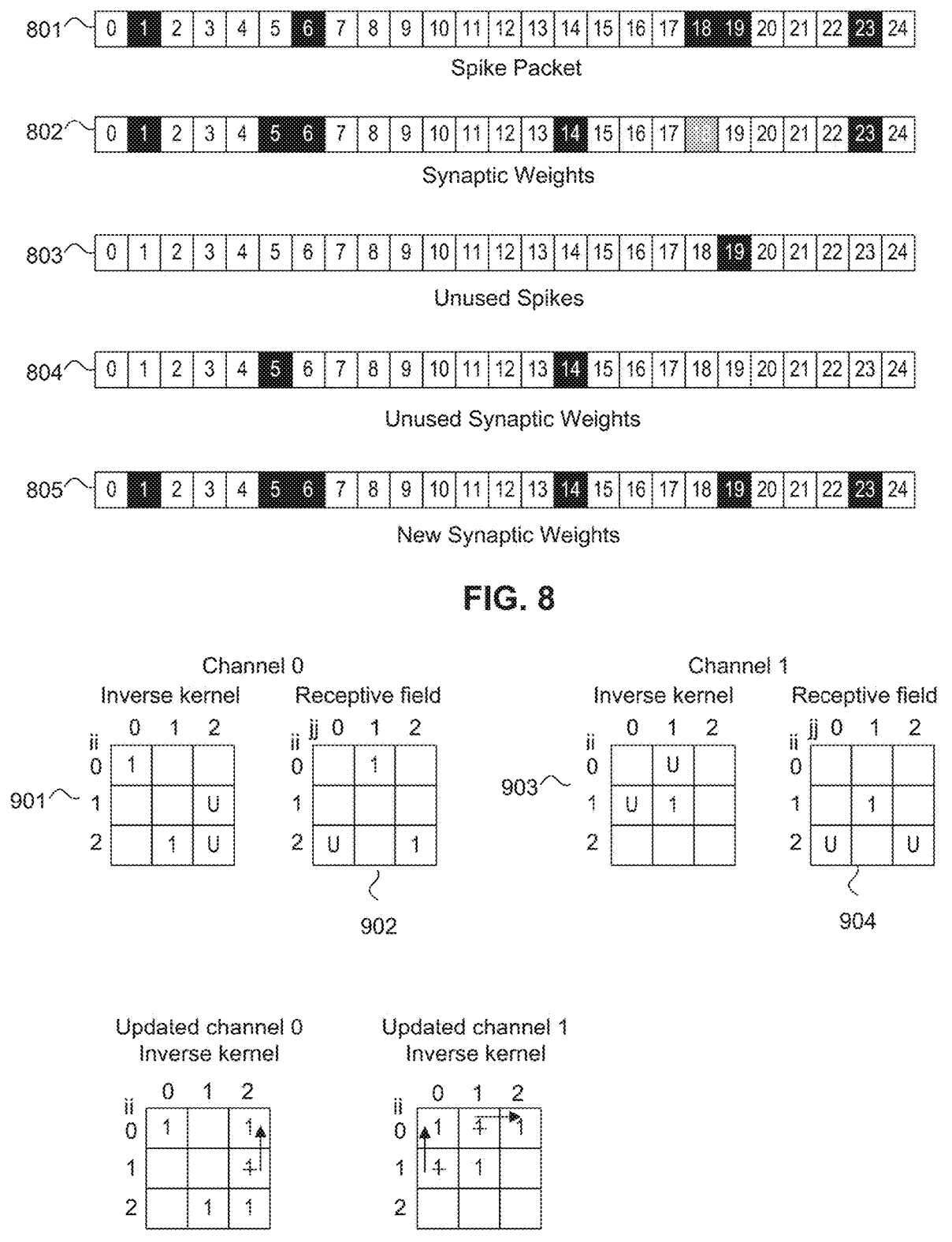

In some embodiments, the value in learning threshold register 111 can initially be set to a low value to allow the neuron to learn. During the learning process, synaptic weights can be assigned to incoming spikes using weight swapper 113. This process is illustrated in FIG. 8 and FIG. 9. In some embodiments, as the neuron learns, the value in the counter 109 increases, and the value in learning threshold register 111 increases as well. This process can continue until the neuron presents a strong response to a specific learned pattern.

Figure 2A:
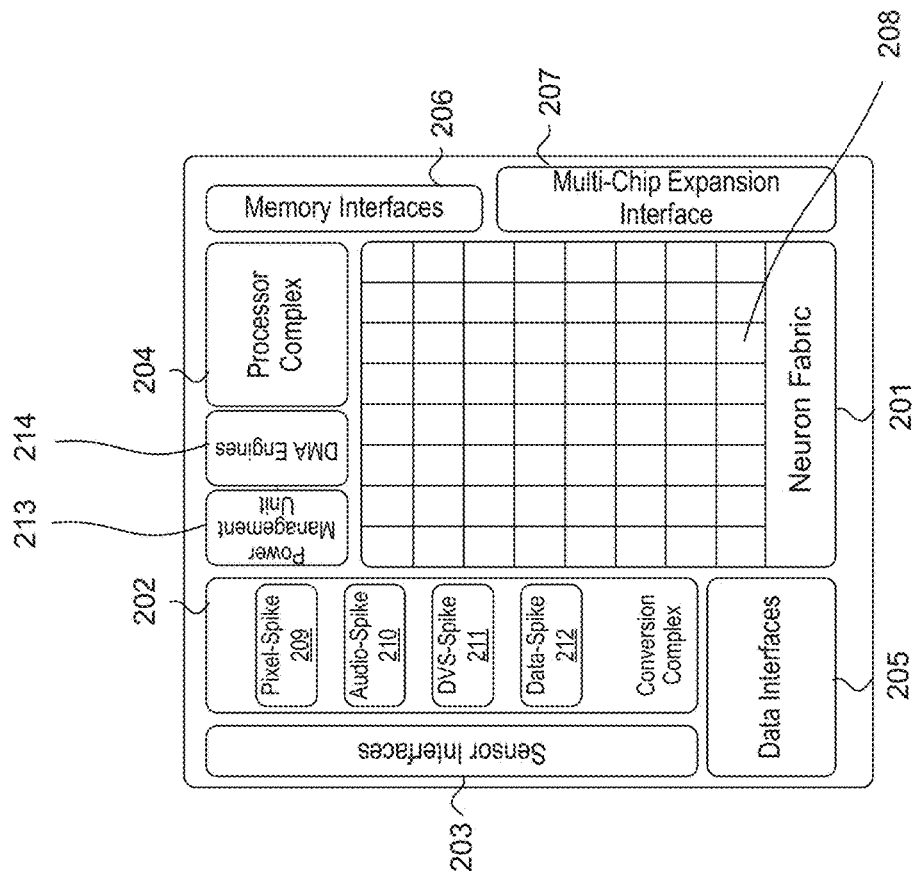
FIG. 2A is a block diagram of a neuromorphic integrated circuit, according to some embodiments.

FIG. 2A is a block diagram of a neuromorphic integrated circuit 200, according to some embodiments. Neuromorphic integrated circuit 200 can include a neuron fabric 201, a conversion complex 202, sensor interfaces 203, a processor complex 204, one or more data interfaces 205, one or more memory interfaces 206, a multi-chip expansion interface 207 that can provide a high speed chip-to-chip interface, a power management unit 213, and one or more Direct Memory Access (DMA) engines 214.

In some embodiments, neuron fabric 201 can include a plurality of reconfigurable neural processors 208. A neural processor 208 can include a plurality of neurons. For example, a neural processor 208 can include a plurality of spiking neuron circuits and a plurality of synapses. As discussed above, a spiking neuron circuit can be implemented using an input spike buffer 103, packetizer 114, packet register 104, logical AND circuit 107, logical AND circuit 108, counter 109, threshold comparator 110, learning threshold value 111, spiking threshold value 112. The plurality of synapses can implement using weights register 106, synaptic weight storage 105, and weight swapper 113. Each neural processor 208 can include a plurality of reprogrammable spiking neuron circuits that can be connected to any part of neural fabric 201.

In some embodiments, conversion complex 202 can include one or more of a pixel to spike converter 209, an audio to spike converter 210, a Dynamic Vision Sensor (DVS) to spike converter 211, and a data to spike converter 212. Pixel to spike converter 209 can convert images to spike events.

In some embodiments, sensor interfaces 203 can include one or more interfaces for pixel data, audio data, analog data, and digital data. Sensor interfaces 203 can also include an AER interface for DVS pixel data.

In some embodiments, processor complex 204 can include at least one programmable processor core, a memory, and input-output peripherals. Processor complex 204 can be implemented on the same die as neuromorphic integrated circuit 200.

In some embodiments, data interfaces 205 can include one or more interfaces for input and output peripherals. The one or more interfaces can use a Peripheral Component Interconnect Express (PCIe) bus standard, a Universal Serial Bus (USB) bus standard, the Ethernet bus standard, a Controller Area Network (CAN) bus standard, and a Universal Asynchronous Receiver and Transmitter (UART) for transmitting and receiving serial data.

In some embodiments, memory interfaces 206 can include one or more interfaces for dynamic random access memory (RAM) expansion. The one or more interfaces can use a double data rate synchronous dynamic random-access memory (DDR SDRAM) standard. For example, the one or more interfaces can use a DDR3 or DDR4 standard.

In some embodiments, multi-chip expansion interface 207 can carry spike information to enable an expansion of neural fabric 201 to multiple chips. Multi-chip expansion interface 207 can carry spike information using AER. AER is a standard for transmitting spike events over a system bus. The address of a specific neuron that spikes at the time that the spike occurs is transmitted.

In some embodiments, neuromorphic integrated circuit 200 can take spike information as input and produce AER spike events as outputs. In addition to outputting the spikes from the last layer of the SCNN, AER spike events can also transmit the membrane potential values for each spiking neuron circuit.

In some embodiments, neural fabric 201 can process spikes in a feed-forward manner. Spikes can be sent between layers using AER format data. Each layer can have an input spike buffer (e.g., input spike buffer 103) that converts spikes stored in the input spike buffer to a set of spike packets. Every layer can process all spikes in an input spike buffer completely before sending its output spikes to the next layer.

Figure 2B:
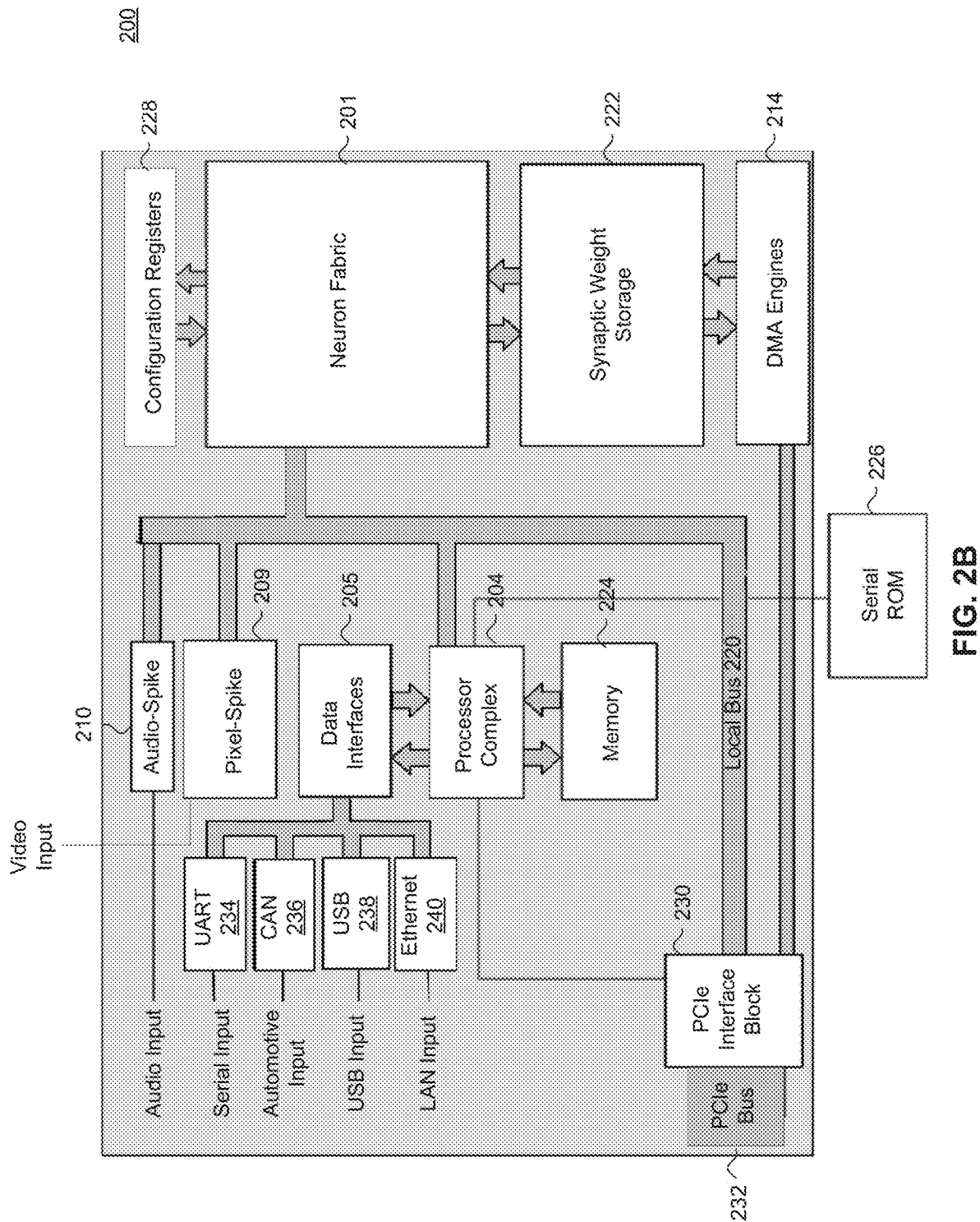
FIG. 2B is a block diagram of the neuromorphic integrated circuit in FIG. 2A, according to some embodiments.

FIG. 2B is another block diagram of the neuromorphic integrated circuit 200 in FIG. 2A, according to some embodiments. FIG. 2B illustrates the interconnection of the components of the neuromorphic integrated circuit 200 using a local bus 220 (e.g., a NoC bus). In FIG. 2B, neuromorphic integrated circuit 200 can include neuron fabric 201, processor complex 204, one or more data interfaces 205, pixel to spike converter 209, audio to spike converter 210, and DMA engines 214, as illustrated in FIG. 2A. Neuromorphic integrated circuit 200 can also include synaptic weight storage 222, memory 224, serial read-only memory (ROM) 226, configuration register 228, PCIe interface block 230, PCIe bus 232, UART interface 234, CAN interface 236, USB interface 238, and Ethernet interface 240.

In some embodiments, synaptic weight storage 222 can be equivalent to synaptic weight storage 105 in FIG. 1. Synaptic weight storage 222 can connect to neuron fabric 201. Synaptic weight storage 222 can store the weights of all synapses and the membrane potential values of all spiking neuron circuits. Synaptic weight storage 222 can be accessed externally through one or more DMA engines 214 from PCIe interface block 230 which can connect to PCIe bus 232.

In some embodiments, configuration registers 228 can connect to neuron fabric 201. During the initialization of neuron fabric 201, processor complex 204 can read serial ROM 226 and configure neuron fabric 201 for an externally defined function by writing values to configuration registers 228 and synaptic weight storage 222.

In some embodiments, processor complex 204 is available externally through PCIe interface 230. A program can be stored in memory 224. The program can determine the function of UART interface 234, CAN interface 236, USB interface 238, and Ethernet interface 240. One or more of these interfaces can deliver data to be processed by neuron fabric 201, processor complex 204, or both.

Audio to spike converter 210 can deliver spikes directly onto local bus 220 to be processed by neuron fabric 201. Pixel to spike converter 209 can connect to an external image sensor and converts pixel information to spike packets, which are distributed on the local bus 220 for processing by neuron fabric 201. Processed spikes can be packetized (e.g., inserted into network packets) and placed on the local bus 220.

Figure 3:
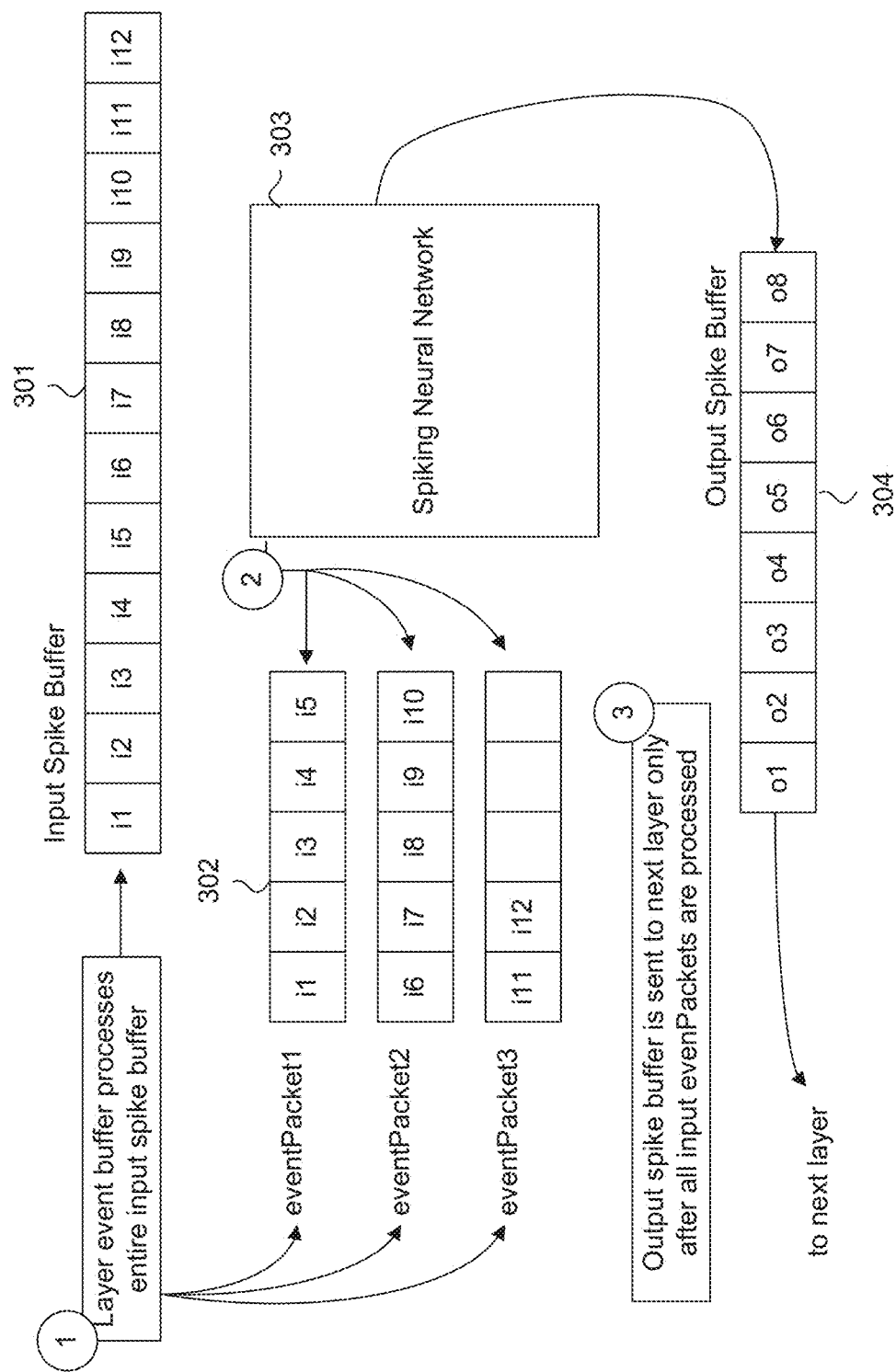
FIG. 3 is a flow diagram of input spike buffering, packetizing, and output spike buffering for a next layer, according to some embodiments.

FIG. 3 is a flow diagram of input spike buffering, packetizing, and output spike buffering for a next layer, according to some embodiments. FIG. 3 includes an input spike buffer 301, one or more spike packets 302, a neuron fabric 303, and an output spike buffer 304. In FIG. 3, spikes in input spike buffer 301 can be sorted into one or more spike packets 302 for specific neurons (e.g., spiking neuron circuits) in neuron fabric 303. After processing in neuron fabric 303, any resulting spikes can be stored in output spike buffer 304 which is sent to the subsequent layer. The resulting spikes in output spike buffer 304 can be packetized for processing by the subsequent layer.

In some embodiments, a layer in neuron fabric 303 can process the entire input spike buffer 301. The layer can process each spike packet 302 sequentially. The resulting output spikes can be placed in output spike buffer 304. Output spike buffer 304 may not be sent to the next layer for processing until all spike packets 302 have been processed. In some embodiments, all layers of neuron fabric 303 can follow this workflow.

In some embodiments, neuron fabric 303 can process many spikes at a time. In some embodiments, different spike buffer types can be used for layers in neuron fabric 303. The type of spike input buffer can depend on the nature of the input data. The difference between spike buffer types can lie in how they generate spike packets from the input spike buffer 301.

In some embodiments, a packetizing buffer type can be used to process continuous or ongoing types of data (e.g., a stream of spikes generated by a DVS camera). A user can configure different layers of neuron fabric 303 to use this buffer type. A packetizing buffer type can enable the processing of many spikes, either one at a time or in very large bursts. A packetizing buffer can stores spikes in the order they are received until the number of spikes reaches a size defined by a parameter (e.g., a packet size) specified in a configuration file (e.g., a YAML file). Once the packetizing buffer reaches the size, a spike packet can be passed to the neural fabric 303 for processing. The packetizing buffer can then be cleared. The packetizing buffer can then continue to store spikes.

In some embodiments, a flushing buffer type can be used to process data in the form of a defined size (e.g., traditional video image frames or defined sets of values). For example, a video frame can have a defined size such as 640 by 480 pixels. In this case, however, many spikes sent at once may be immediately sent for processing as a single packet. The spike packets can be different lengths.

In some embodiments, each layer type can implement a function which processes the entire spike input buffer (e.g., spike input buffer 301) by first generating packets from the spike input buffer. After the entire spike input buffer has been packetized, this function can process all spike packets. This function can then delete the processed spike packet and push the output spikes from the spike packet to the output spike buffer (e.g., output spike buffer 304). This function can then get the next spike packet to process. The difference between buffer types can lie in how they generate spike packets from the input spike buffer.

Figure 4:
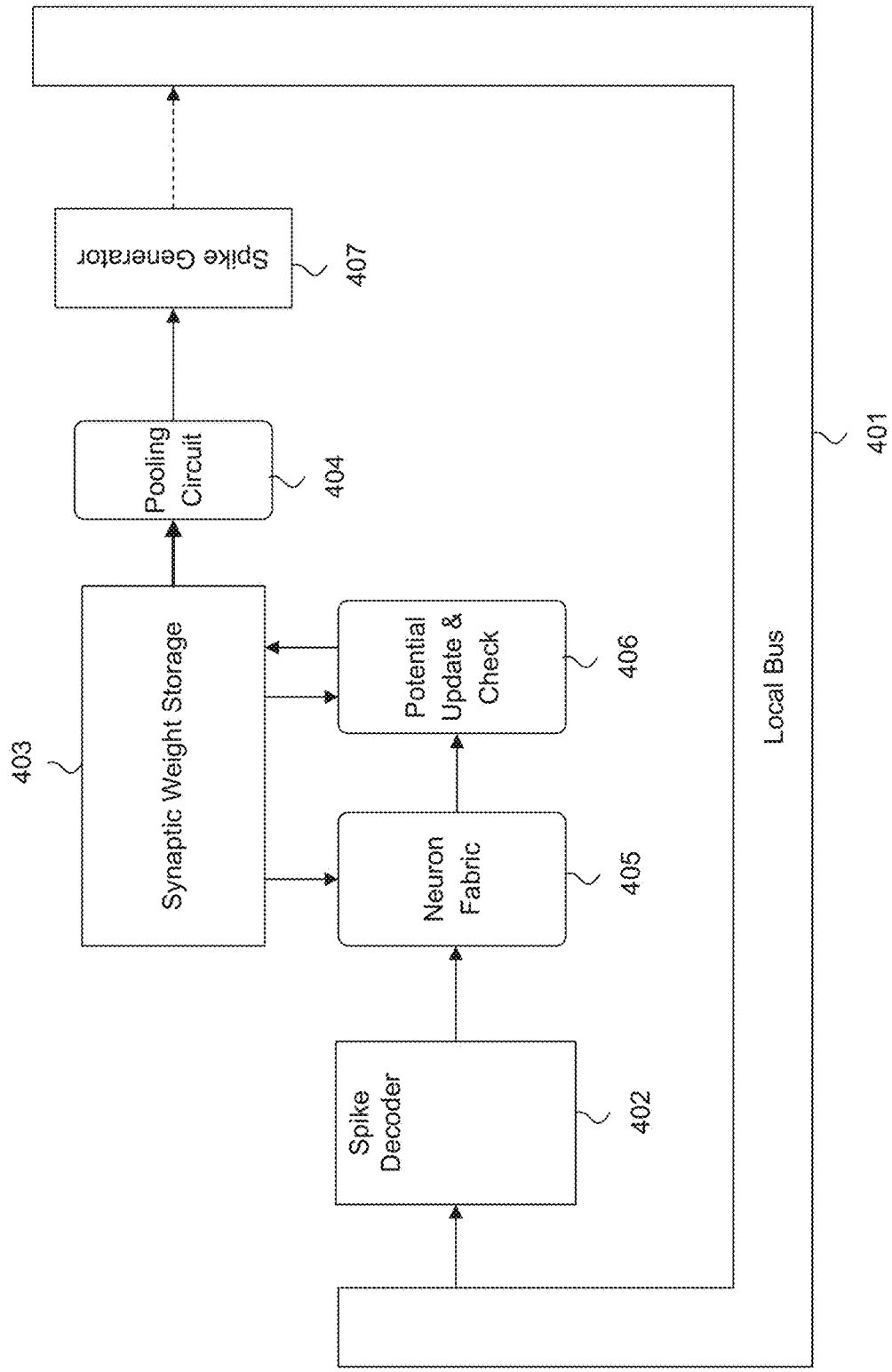
FIG. 4 is a block diagram of a neural processor configured as a spiking convolutional neural processor, according to some embodiments.

FIG. 4 is a block diagram of a neural processor 400 configured as a spiking convolutional neural processor, according to some embodiments. The neural processor 400 can include a network on a local bus 401 (e.g., a NoC bus), a spike decoder 402, a synaptic weight storage 403, a neuron position generator, a pooling circuit 404, a neuron fabric 405, a potential update and check circuit 406, and a spike generator 407. Neuron fabric 405 can be equivalent to neuron fabric 201 in FIG. 2. Synaptic weight storage 403 can store synaptic weight values and membrane potential values for neurons (e.g., potential array). Pooling circuit 404 can perform a max pooling operation, average pooling operation, or other type of pooling operation as would be appreciated by a person of ordinary skill in the art. One to many spike generator circuit 407 can generate spike packets which can be transmitted one to many across local bus 401.

Figure 5:
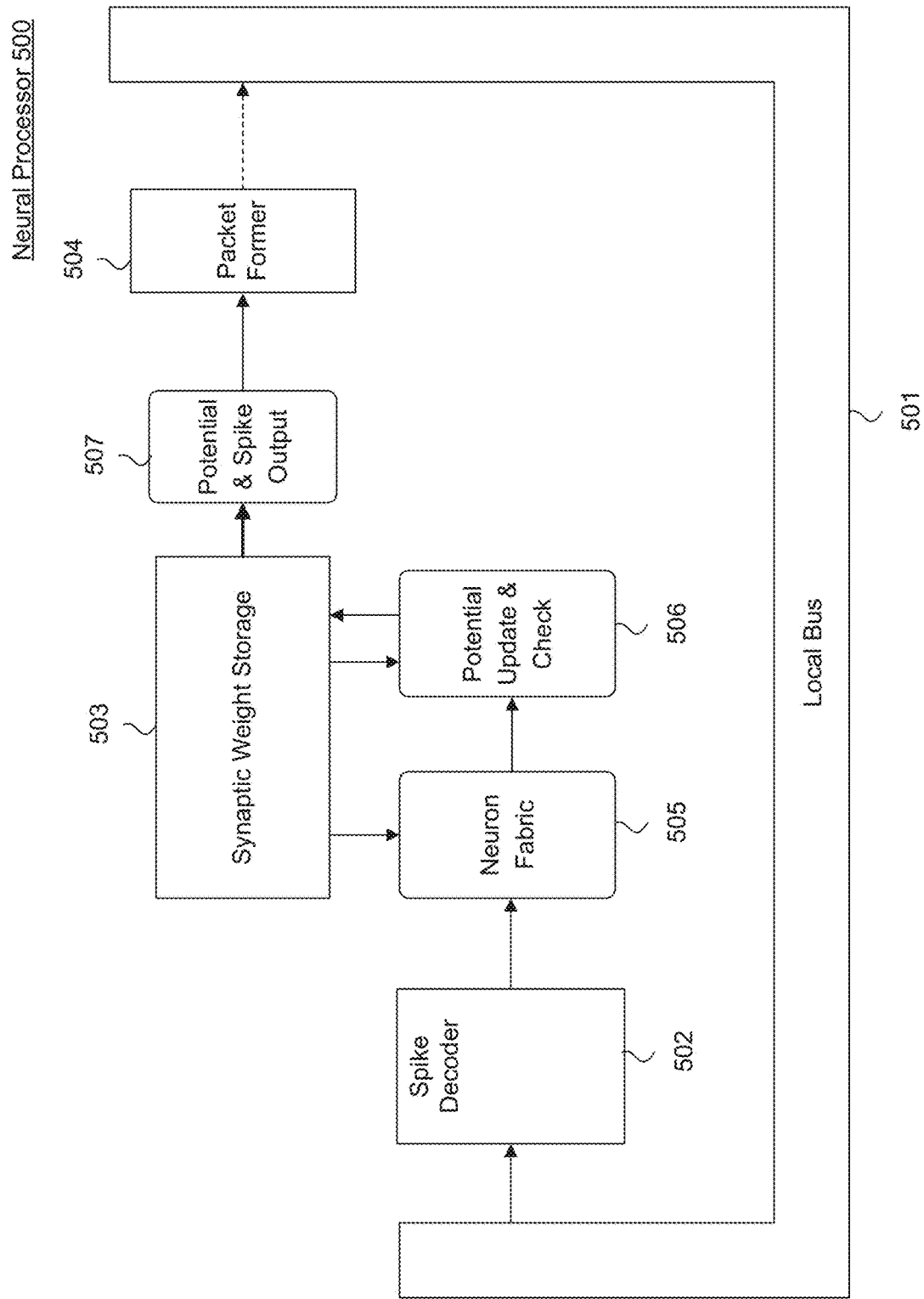
FIG. 5 is a block diagram of a neural processor configured as a spiking fully connected neural processor, according to some embodiments.

FIG. 5 is a block diagram of a neural processor 500 configured as a spiking fully connected neural processor, according to some embodiments. The neural processor 500 includes a local bus 501 (e.g., a NoC bus), a spike decoder 502, a synaptic weight storage 503, a neuron position generator, a packet former 504, a neuron fabric 505, a potential update and check circuit 506, and a potential and spike output circuit 507. Neuron fabric 505 can be equivalent to neuron fabric 201 in FIG. 2. Synaptic weight storage 503 can store synaptic weight values and membrane potential values for neurons (e.g., potential array). In FIG. 5, spikes can be received into a spike input buffer and distributed as spike packets using spiking decoder 502.

In some embodiments, synapse weights can be tertiary weights. These tertiary synapse weights can be 2-bits wide. These 2-bit wide synapse weights can include both positive and negative values. This is different than conventional SNNs. Positive values in the 2-bit wide synapse weights can increase a membrane potential value of a neuron. Negative values in the 2-bit wide synapse weights can decrease a membrane potential value of a neuron.

In some embodiments, spikes in a spike packet can be distributed according to their synapse destination numbers. In some embodiments, during processing, the tertiary synaptic weights are logical ANDed with the spikes represented in the spike packet. The spikes in a spike packets can be represented using positive spike bits. The absence of a spike in a spike packet can be represented using a zero. Synaptic weights can be negative or positive. A negative synaptic weight can decrement counter 109 (e.g., membrane potential register) of the neuron. A positive synaptic weight can increment counter 109 (e.g., membrane potential register) of the neuron.

In some embodiments, a learning process can be implemented by examining an input when a learning threshold value of the neuron is reached (e.g., a value in learning threshold register 111). The learning threshold value of the neuron can be initially set to a very low value. The learning threshold value can increase as the neuron learns and more synaptic weights are matched. In some embodiments, the learning process may involve the swapping of unused synaptic weights (e.g., a positive synaptic weight in a location where no spike has occurred) and unused spikes (e.g., a spike in the spike packet that is in a position relative to a synaptic weight having a value of zero). The unused synaptic weights can be swapped to locations containing unused spikes.

In some embodiments, if the neuron membrane potential value (e.g., represented by counter 109) exceeds a spiking threshold value (e.g., a value in spiking threshold register 112) then a spike is generated. The spike is placed on the local bus.

Figure 6A:
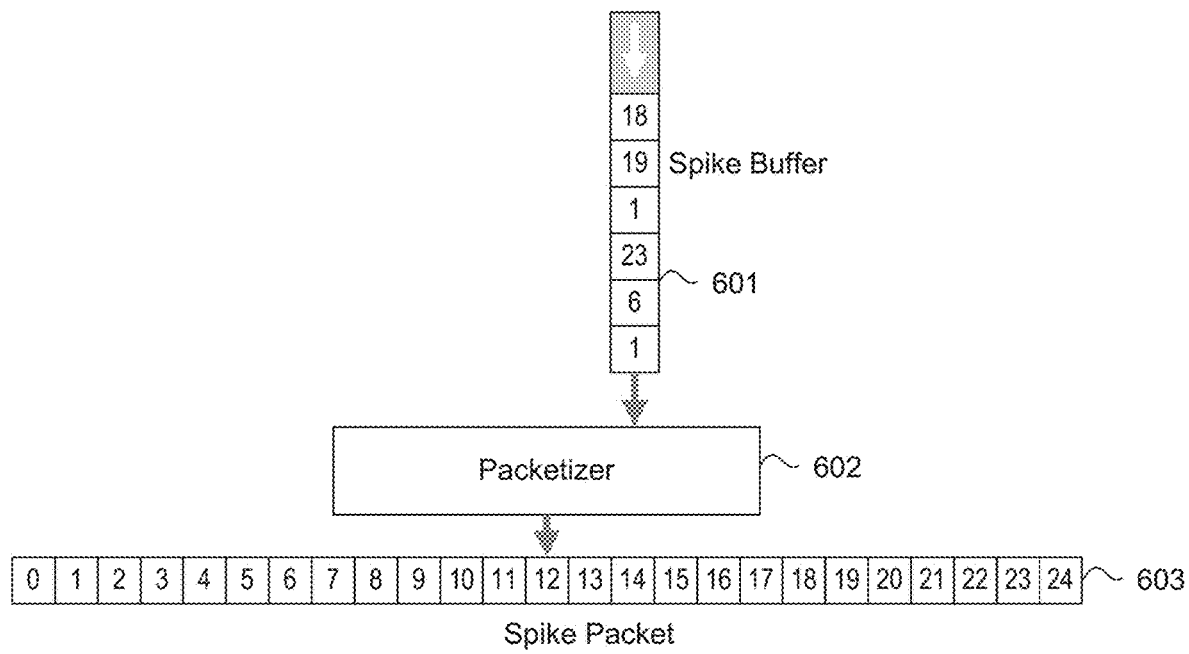
FIG. 6A is an example of packetizing spikes into a spike packet, according to some embodiments.

FIG. 6A is an example of packetizing spikes into a spike packet, according to some embodiments. In FIG. 6A, spike input buffer 601 (e.g., equivalent to spike input buffer 103) receives spikes from a local bus that have been processed by a spike decoding circuit. Packetizer 602 can sort the spikes in the spike input buffer 601 into a spike packet 603 according to the spikes' synapse index numbers. For example, in FIG. 6A, the spike sequence that is received is 1, 6, 23, 1, 19, 18. As would be appreciated by a person of ordinary skill in the art, the spike sequence may be much larger than the small number of spikes shown in FIG. 6A. For example, the spike sequence can include thousands of spikes that are distributed to a multitude of synapses.

Figure 6B:
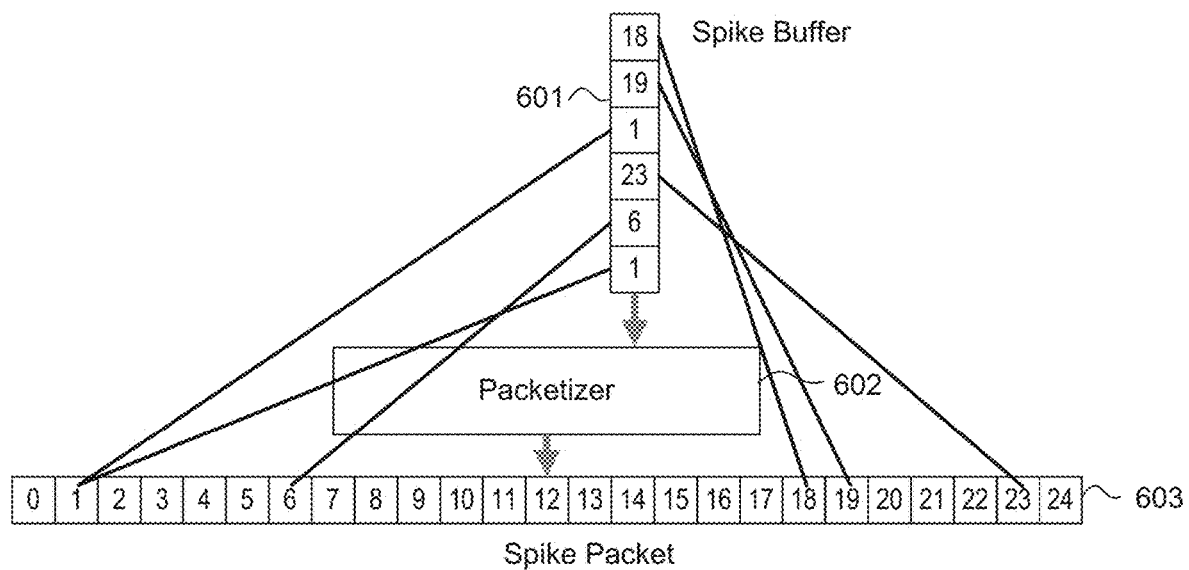
FIG. 6B is an example representation of a spike packet in FIG. 6A, according to some embodiments.

FIG. 6B is an example representation of spike packet 603 in FIG. 6A, according to some embodiments. In FIG. 6B, spike packet 603 contains the sorted spikes from spike input buffer 601. In spike packet 603, positions 1, 6, 18, 19, and 23 are highlighted indicating they contain logic '1' values. The remaining positions within spike packet 603 contain zeros (e.g., indicating the absence of a spike).

In some embodiments, spikes can be organized in the same order as the synapse weights are located in memory (e.g., synaptic weight storage 105). This can make it possible to perform AND operations between the synaptic weight values and the spikes in the incoming spike packets to determine if the membrane potential counter (e.g., counter 109) is incremented or decremented. When a spike occurs at a position where the synaptic weight value is zero the counter is not changed for that bit position.

Figure 7:
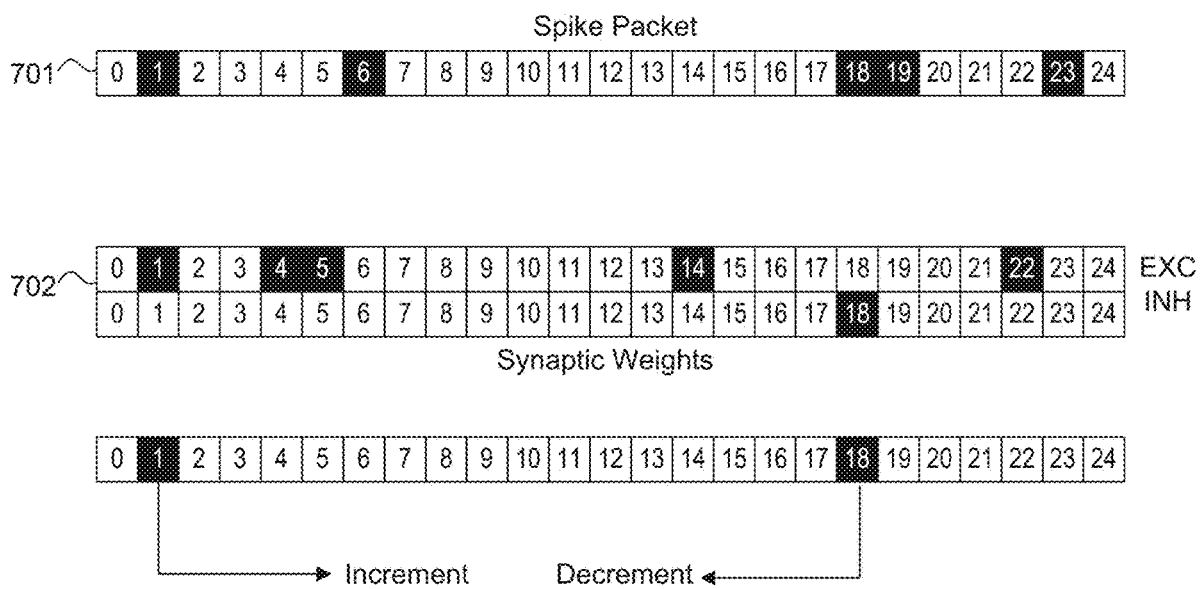
FIG. 7 is an example of a method of selecting which bits increment or decrement a membrane potential counter, according to some embodiments.

FIG. 7 is an example of a method of selecting whether the membrane potential value (e.g., counter 109) is incremented or decremented, according to some embodiments. In FIG. 7, a logical AND operation is performed between spike packet 701 and weights register 702 (e.g., weight register 702 is equivalent to weight register 106). In FIG. 7, spike bits 1, 6, 18, 19, and 23 of spike packet 701 are highlighted indicating they contain logic '1' values (e.g., indicating the presence of a spike). The remaining positions within spike packet 701 contain zeros (e.g., indicating the absence of a spike).

Weight register 702 can contains logic bits that indicate either positive or negative values. In FIG. 7, bits 1, 4, 5, 14, and 22 contain positive values while bit 18 contains a negative value. Positive values can indicate an excitatory action while negative values can indicate an inhibitory action. The bits in weight register 702 can be labeled EXC for excitatory and INH for inhibitory weights. A logical AND is performed between the bits in weight register 702 and the bits in spike packet 701. The spike that occurred in position 1 therefore increment the membrane potential value (e.g., counter 109) of the neuron. In contrast, the spike that occurred in position 18 decrements the membrane potential value (e.g., counter 109) of the neuron.

FIG. 7 is an example of a Spike Time Dependent Plasticity (STDP) learning method, according to some embodiments. In STDP learning, spikes that contribute to an output event/spike can have their representative synaptic weights strengthened while spikes that did not contribute to an output event/spike can have their synaptic weights weakened.

In some embodiments, the STDP learning method is modified such that unused synaptic weights are swapped to locations contained unused spikes. For example, synaptic weights that are zero, and received a spike, are swapped with synaptic weights that are logic '1' and did not receive any spike.

In some embodiments, when a logical AND operation is performed on a spike bit in the spike packet that is '1' and a synaptic weight that is zero, the result is a zero. This can be referred to as an 'unused spike.' When a logical AND operation is performed on a spike bit in the spike packet that is '0' and a synaptic weight that is '1', the result is zero. This can be referred to as an 'unused synaptic weight'. The learning circuit (e.g., weight swapper 113) can swap random selected unused synaptic weights where unused spikes occur.

In FIG. 7, position 1 in spike packet 701 contains a used spike. Position 1 in synaptic weights 702 contains a used weight. This can result in an increment of the membrane potential value (e.g., counter 109) of the neuron.

Positions 4 and 5 of synaptic weights 702 contain unused synaptic weights. These synaptic weights are candidates for swapping. Position 6 of spike packet 701 contains an unused spike. In other words, position 6 of spike packet 701 contains 1 but position 6 of synaptic weights 702 contains a zero. An unused synaptic weight can be swapped to this position. Position 14 of synaptic weights 702 contains an unused synaptic weight. Position 18 of spike packet 701 contains a used spike and position 18 of synaptic weights 702 contains a used synaptic weight (in this case inhibitory). This can result in a decrement of the membrane potential value (e.g., counter 109) of the neuron. Position 19 of spike packet 701 contains an unused spike. Position 22 of synaptic weights 702 contains an unused synaptic weight. Position 23 of spike packet 701 contains an unused spike.

This STDP learning method is inspired by the learning that takes place in the biological brain. In some embodiments, a modified form of the STDP learning method is used to perform learning. This modified method is similar to the mechanism by which biological neurons learn.

In some embodiments, a spiking neuron circuit emits a spike when its inputs drive its membrane potential value (e.g., counter 109) up to a threshold value. This can mean that when the neuron is driven to the threshold value and generates a spike, connections from its recently activated inputs are strengthened, while a number of its other connections are weakened. The can result in neurons learning to respond to patterns of inputs that they see repeatedly, thereby autonomously learning the features that characterize an input dataset.

In some embodiments, depending on other properties of this STDP method, such as natural competition between neurons caused by the variation of learning threshold values, the population of neurons within a layer learn a broad coverage of the input feature space. Thus, the response of the population of neurons to a given input carries information about the features that are present.

In the brain, sensory processing is typically hierarchical, taking place over a series of layers. Early layers extract information about simple features, with higher layers learning to respond to combinations of those features, such that their responses are both more selective to more complex shapes or objects, and more general in that they are invariant to spatial position or orientation.

In some embodiments, this modified STDP learning method is completely unsupervised. This is different than conventional diverse supervised training methods that are in use in neural networks. This means that embodiment herein can be presented with an unlabeled dataset, and without any additional information can learn to respond to different features that are present in the data. Learning can be an ongoing process.

In some embodiments, there is no need to retrain the entire neural network (e.g., neuron fabric 201) when a new class is added to an already-trained data-set. This can eliminate the technological problem of catastrophic forgetfulness. By allowing learning to continue, new classes can be added to the features that are already recognized by the network.

Unsupervised learning can extract features. However, in the absence of labeled data, unsupervised learning cannot directly 'label' its outputs. In a classification task, the neural network (e.g., neuron fabric 201) can learn a set of features that differentiate classes present in the stimulus data set. It can then be up to the user to apply a method linking responses representing features to input labels.

FIG. 8 illustrates a weight swapping step of the STDP learning method, according to some embodiments. FIG. 8 shows an example of the next step in the modified STDP learning process whereby 'unused synaptic weights' are swapped to 'unused inputs' thereby strengthening the neurons' response to the same or a similar input spike pattern in the future.

In FIG. 8, spike bits 1, 6, 18, 19, and 23 of spike packet 801 are highlighted indicating they contain logic '1' values (e.g., indicating the presence of a spike). The remaining positions within spike packet 801 contain zeros (e.g., indicating the absence of a spike). Bits 1, 4, 5, 14, and 22 of synaptic weights 802 contain '+1' values while bit 18 contains a '−1' value. Bit 19 of unused spikes 801 represents an unused spike in spike packet 801. Bits 5 and 14 of unused synaptic weights 802 represents unused synaptic weights in synaptic weights 802. In FIG. 8, new synaptic weights 805 represents the result of swapping unused synaptic weights (e.g., a positive synaptic weight in a location where no spike has occurred) and unused spikes (e.g., a spike in the spike packet that is in a position relative to a synaptic weight having a value of zero). For example, bit 14 of new synaptic weights 805 contains the value of bit 18 of synaptic weights 802 and vice versa.

FIG. 9 illustrates convolution in a neural processor configured as a spiking fully connected neural processor, according to some embodiments. For example, FIG. 9 shows the modified STDP method of learning by weight swapping in convolution layers which are used in neural processors configured as spiking fully connected neural processors.

A convolution can be a mathematical operation with the purpose of extracting features from data (e.g., an image). The result of a convolution between two sets of data, whether image data or another data type, is a third set of data.

In some embodiments, a convolution can acts on spikes and potential values. Each neural processor (e.g., neural processor 208) can identify the neuron with the highest potential value and broadcast it to other neural processors in the same layer. In some embodiments, if the potential value of the neuron is higher than the learning threshold value (e.g., a value in learning threshold register 111), the synaptic weights of all kernels of the neurons outputting to the neuron are updated. The same event packet can be re-transmitted from the previous layer. A neural processor may only affect the spikes within a receptive field of the neuron. For example, in FIG. 9, like the area within the square of 902. The neural processor 208 identified the unused spikes (shown as U) in the receptive field and the unused weights (show as U) in the kernels (e.g., kernels 901 and 903).

In some embodiments, the modified STDP learning method can determine the total number of swapped bits across all kernels between unused and preferred synaptic weights according to a rule. For example, the rule may be that number of swapped bits=min(number of swaps, number of unused spikes, number of unused weights), where number of swaps can be a configuration field. In this example, min(5, 3, 4)=3. The modified STDP learning method can then randomly swap "number of swapped bits" bits across all kernels. In FIG. 9, three bits are swapped. The modified STDP learning method can then update the synaptic weights of the filter of all other neural processors of the same layer accordingly.

Neural networks can have a training phase. The training phase can use known samples. Neural networks can also have an inference stage during which samples that were not previously used are recognized. During the training phase, output neurons are labelled according to the stimulus class that they respond most to. During the inference phase, the inputs are labelled according to the features that neurons responded most to. The unsupervised learning method of embodiments herein can be useful where a substantial dataset exists of which only a small portion has been labelled. In this case, embodiments herein can be trained on the entire dataset, after which a supervised stage is performed to label the network outputs using the smaller labelled dataset.

In some embodiments, a supervised learning algorithm can be used. The inference component of embodiments herein can be completely separable from the learning algorithm, retaining its benefits of fast, efficient computation. Embodiments herein have been designed such that synaptic weights learned offline using an algorithm of the user's choice can easily be uploaded. The network design can be restricted to binary or ternary synaptic weights and activation levels. A growing number of third-party techniques exist destined for supervised learning within these constraints.

While unsupervised learning can perform well on these tasks, aided by supervision at some stage, there will be some cases where a supervised learning method has an advantage. Equally however, unsupervised learning has the capacity to perform tasks that are impossible for a supervised learning method—e.g., finding unknown and unexpected patterns in data where there is no labelled outcome to use for supervision. These approaches are easy to miss.

Figure 10:
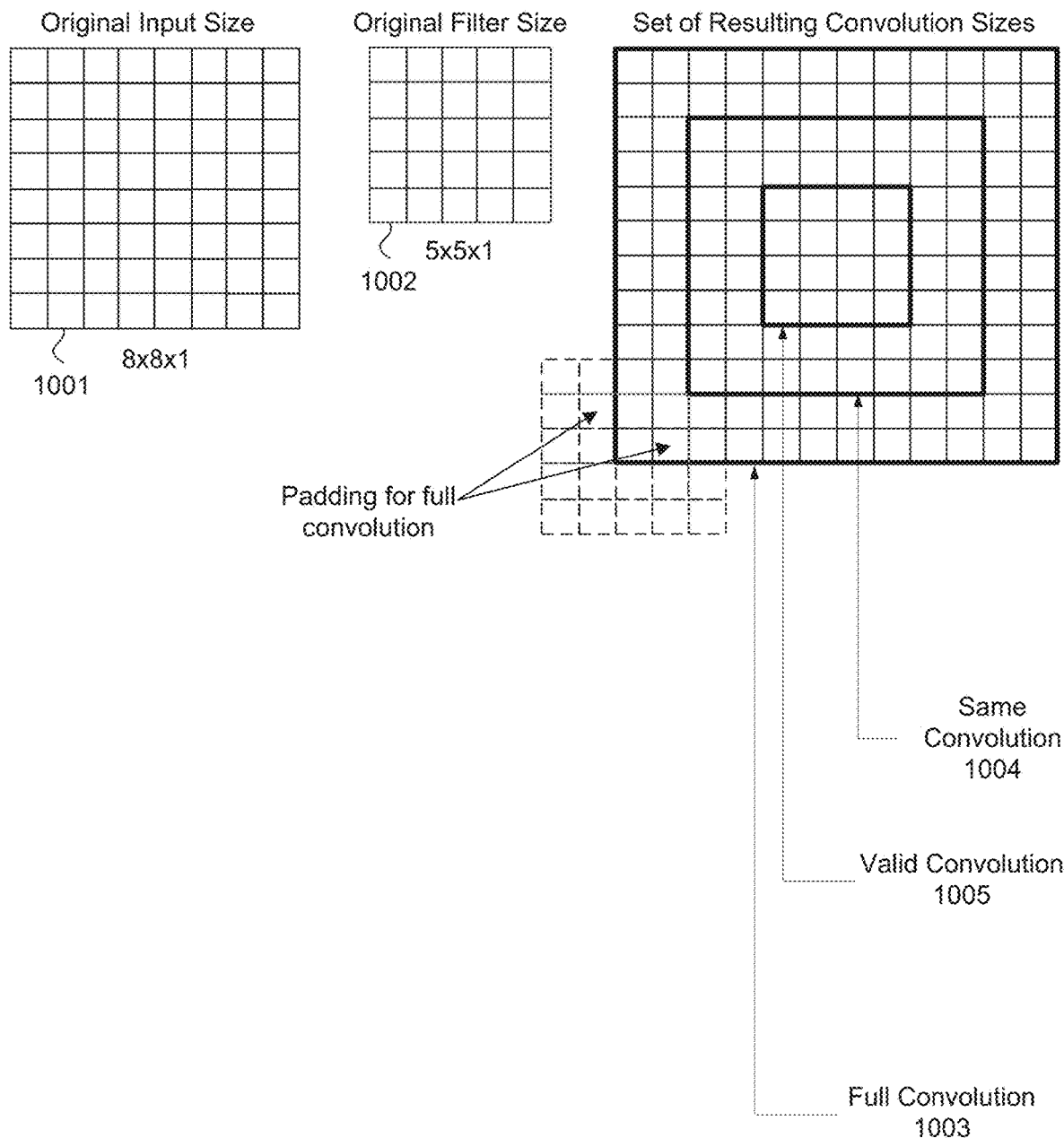
FIG. 10 illustrates a symbolic representation of a convolution in an 8 by 8 matrix of pixels of depth 1, according to some embodiments.

FIG. 10 illustrates a symbolic representation of a convolution in an 8 by 8 matrix of pixels of depth 1, according to some embodiments. In FIG. 10, an example 5 by 5 convolution filter 1002 is applied. In FIG. 10, filter 1002 is allowed to 'stick out' of the original input. In FIG. 10, this can be done by padding the original input 1001 with zeros.

Four convolution types are supported: valid, same, full and padding. FIG. 10 illustrates the resulting convolutions. A 'full' convolution (e.g., full convolution 1003) can increase the output convolution size the most with a padding of 4. A 'same' convolution (e.g., same convolution 1004) can use a padding of 2 to generate an output convolution size that is the same as the original input dimensions (e.g., 8×8×1). A 'valid' convolution (e.g., valid convolution 1005) can use 0 padding and result in an output convolution size that is less than the original input dimensions.

In some embodiments, the SCNN can be allowed to use full convolution, same convolution, or valid convolution. The SCNN can also be allowed to use a custom convolution type referred to as 'padding.' A programmer can indicate a padding convolution type by specifying the padding around each side of the original input 1001.

In some embodiments, the different types of convolution can be defined by Equations 2-4. Equations 2-4 can define a size of the convolved input as a function of the original input size and the filter size. In Equations 2-4, $I_w$ can represent the width of the original input, $C_w$ can represent the width of the convolved input (e.g., potential array), and $k_w$ can represent the width of the filter.

$$\text{Valid type:} C_w = I_w - (k_w - 1) \tag{2}$$

$$\text{Same type:} C_w = I_w \tag{3}$$

$$\text{Full type:} C_w = I_w + (k_w - 1) \tag{4}$$

Figure 11:
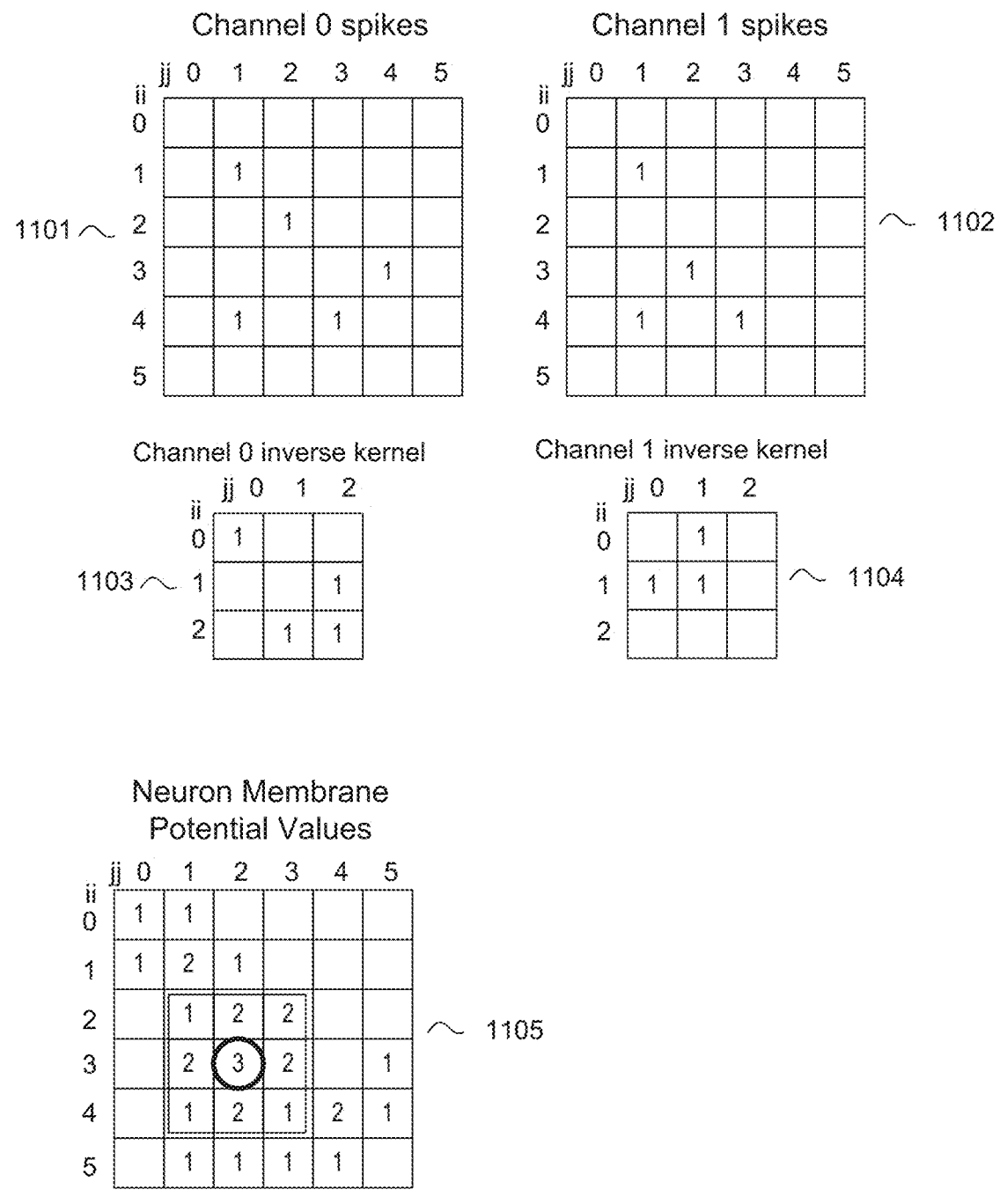

FIG. 11 illustrates a symbolic representation of a convolution involving 2 channels of spikes, two 3 by 3 inverse convolution kernels, and resulting membrane potential values, according to some embodiments. FIG. 11 illustrates two channels of spikes 1101 and 1102. FIG. 11 further illustrates two 3×3 inverse convolution kernels 1103 and 1104, and resulting neuron membrane potential values 1105. A two-channel example of the present embodiment is presented here, with the modification that these operations are performed using spiking neuron circuits rather than a programmed processor. First, all the potentials in a neural processor configured as a SCNN processor are cleared to zeros. When an spike packet comes in, the processing of the spike packet causes the membrane potential values of affected neuron circuits to change.

Figure 12:
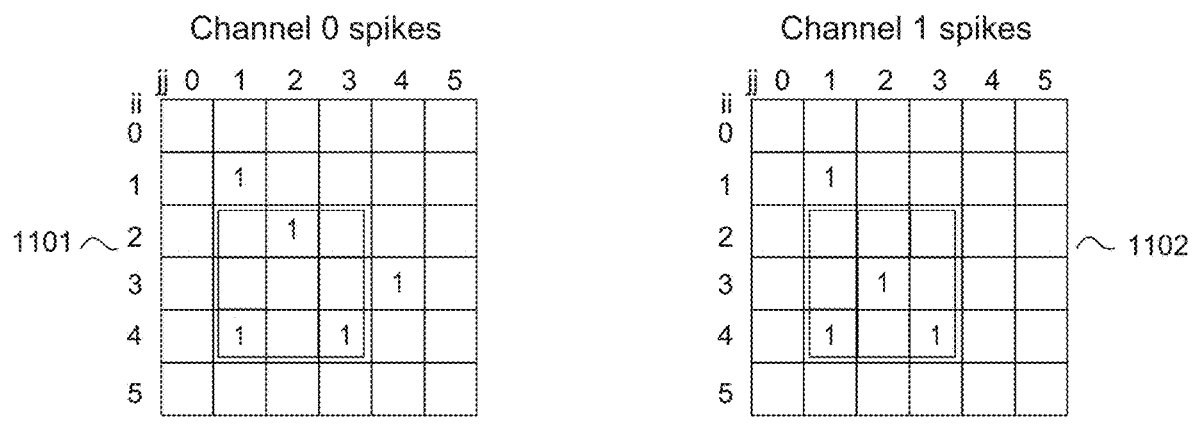

FIG. 12 illustrates the resulting spikes generated in spiking neuron circuits on channels 1101 and 1102 of FIG. 11, according to some embodiments. Channel 1101 illustrates the spiking neuron circuits that fired as '1's in the matrix. All the other locations in channel 1101 are filled with zeros. The spike map can be convoluted using the two inverse kernels 1103 and 1104 shown in FIG. 11 for channels 1101 and 1102, resulting in the neuron membrane potential values 1105 shown in FIG. 11.

Figure 13:
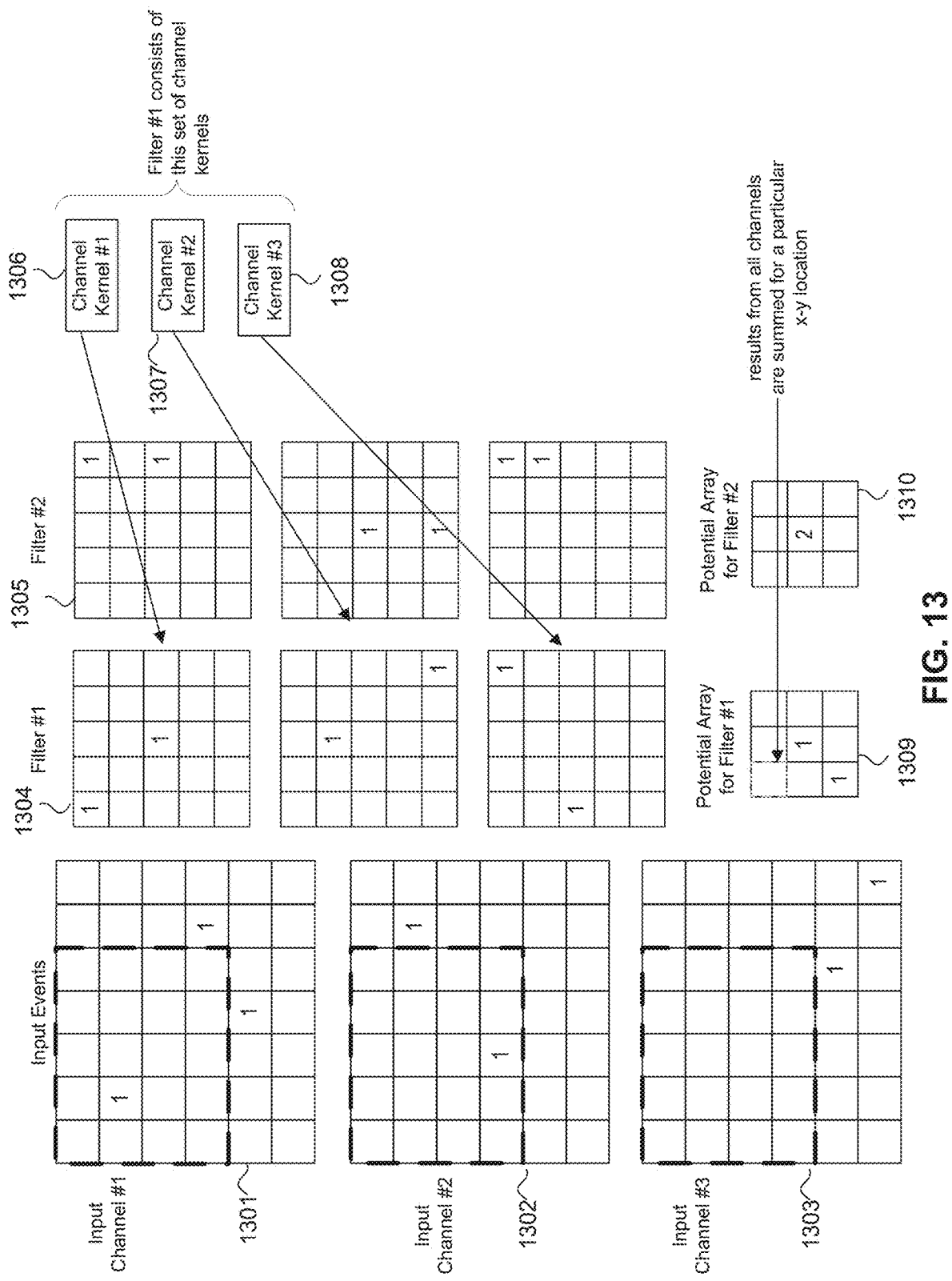
FIG. 13 illustrates a spiking neural network convolution operation, according to some embodiments.

FIG. 13 illustrates a spiking neural network convolution operation, according to some embodiments. FIG. 13 shows an input (e.g., an image) with three channels (e.g., channels 1301, 1302, and 1303) being processed by two filters (e.g., filters 1304 and 1305). Blank entries in filters 1304 and 1305 can correspond to zero values.

In FIG. 13, filter 1304 has a dimensionality of 5×5×3 (e.g., filterWidth× filterHeight× channelNumber). Filter 1304 is centered on coordinates (2, 2) of the input image. The upper-left corner of the input image has coordinates (0, 0). The width and height of the filter can be smaller than the input image. As would be appreciated by a person of ordinary skill in the art, a filter often has a 3×3, 5×5, or 7×7 configuration.

In some embodiments, a filter can have different sets of weights that correspond to a specific channel of the input. Each set of weights can be referred to as kernel of the filter. In FIG. 13, filter 1304 has three kernels (e.g., kernels 1306, 1307, and 1308). The number of kernels in each filter can match the number of channels in the input. Every input event can have an (x, y) coordinate and a channel coordinate.

In some embodiments, the results of a convolution operation are summed into a single entry in a potential array. In FIG. 13, the dotted boxes show where filter 1304 convolutions take place over the inputs. The smaller dotted box in potential array 1309 for filter 1304 shows where these inputs are summed.

In FIG. 13, the convolution operation performed by filter 1304 can be described as a 3D dot product. The dotted box shows where filter 1304 aligns with the input. The 3D dot product sums across x, y, and channel and places this scalar sum into a third matrix called a potential array (or an activation map). In FIG. 13, potential array 1309 represents the potential array for filter 1304. As would be appreciated by a person of ordinary skill in the art, each element of the potential array can be viewed as the membrane potential value of a neuron (e.g., spiking neuron circuit).

In FIG. 13, potential arrays 1309 and 1310 represent the potential arrays corresponding to filters 1304 and 1305. The dotted box shows the result of the current convolution. The dimensionality of a potential array can define the total number of neurons (e.g., spiking neuron circuits). In FIG. 13, filters 1304 and 1305 each simulate nine neurons. Each filter 1304 and 1305 can be centered at a different x-y position within the three input channels. This example of convolution in FIG. 13 shows binary values for the elements in the input image and the weights in filter 1304 and 1305. However, as would be appreciated by a person of ordinary skill in the art, the elements in the input image and the weights in filter 1304 and 1305 can include positive and negative floating-point values.

In some embodiments, discrete convolution can be performed using Equation 1. In Equation 1, f can represent the input and g can represent a filter (e.g., filter 1304). As would be appreciated by a person of ordinary skill in the art, Equation 1 is similar to calculating a dot product centered at a different image location for each value. However, as would be appreciated by a person of ordinary skill in the art, the filter may need to be 'flipped' before being 'slid' over the input for each dot product. The convolution operation may require the indices to be flipped in the filter because it is a useful mathematical property.

$$(f * g) = \sum_{m=-\infty}^{\infty} f[m]g[n-m] \quad (1)$$

In some embodiments, a stride of a convolutional layer can be defined as how much a filter (e.g., 1304) is shifted between subsequent dot product operations. In some embodiments, convolution stride can be hard-coded as 1.

In FIG. 13, filters 1304 and 1305 are not allowed to 'stick out' of the original input image at all during the convolution operation. This type of convolution can be referred to as 'valid' convolution. This type of convolution can result in a potential array (e.g., potential arrays 1309 and 1310) that is smaller than the original input.

Figure 14:
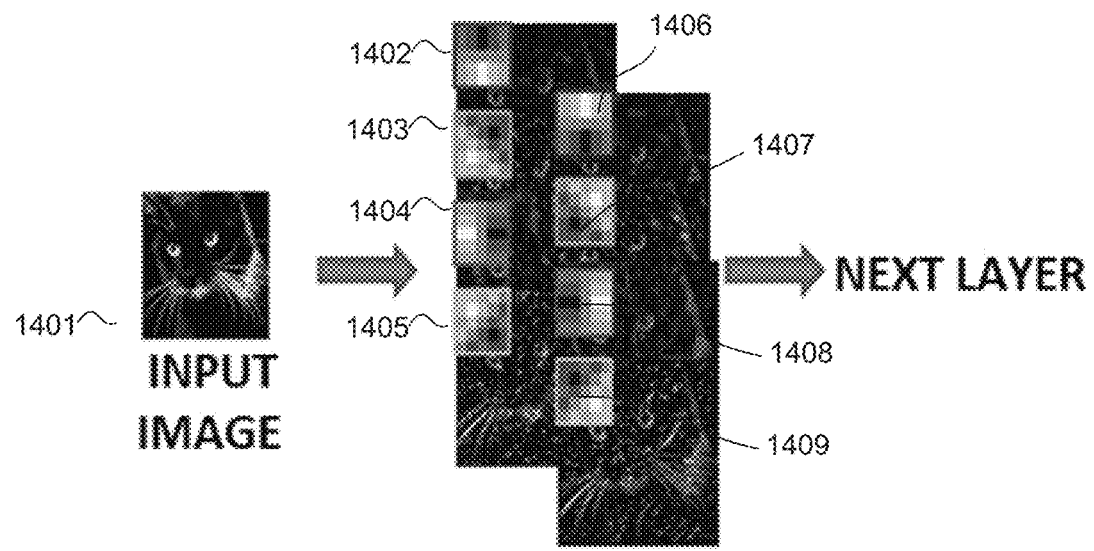
FIG. 14 illustrates the result of eight directional filter neuron convolutions being applied to an input image, according to some embodiments.

FIG. 14 illustrates the result of eight directional filter neuron convolutions being applied to an input image, according to some embodiments. In FIG. 14, input image 1401 containing a cat with a single channel is converted to a spike map that has the same width and height dimensions as the original image, with channels 1402, 1403, 1404, 1405, 1406, 1407, 1408, and 1409.

Figure 15:
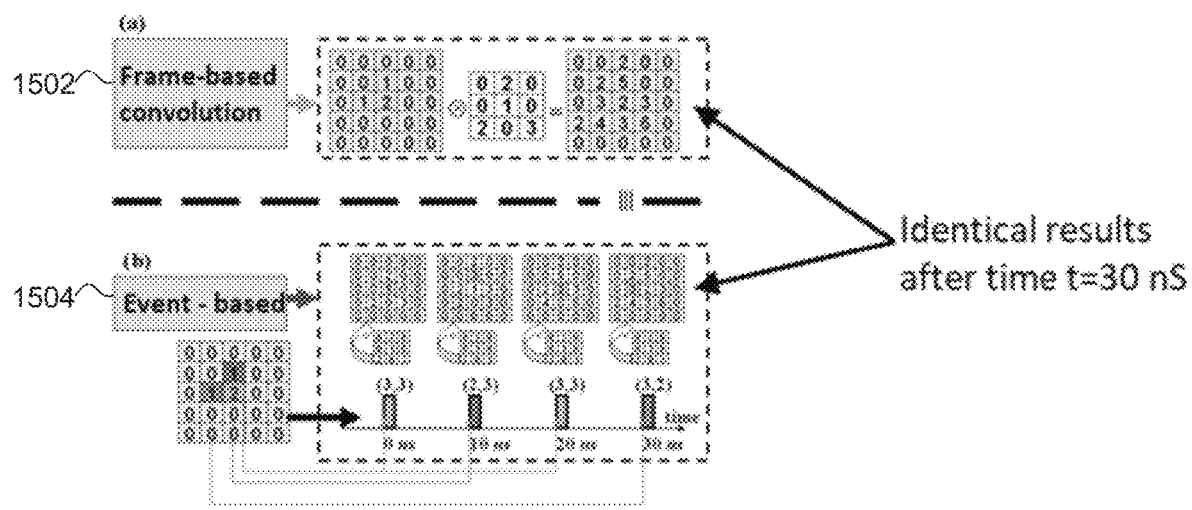
FIG. 15 illustrates the similarity between DVS spike-based convolution and frame-based convolution, according to some embodiments.

FIG. 15 illustrates the similarity between DVS spike-based convolution and frame-based convolution, according to some embodiments. Frames can refer to the frames that are transmitted by a standard video camera. Events (or spikes) are transmitted by spike- or event-based cameras. Event-based convolution can perform a convolution operation at each event (or spike) and places the result in the output membrane potential array. Frame-based convolution 1502 shows a classical frame-based convolution where convolution is performed over the full image. The parameters and result of the convolution are shown. Event-based convolution 1504 shows an event-based convolution operation where an event (or spike) at (3, 3) is processed at time 0 nanoseconds (ns), then an event at (2, 3) is processed at time 10 ns, then another event at (3, 3) is processed at 20 ns, and finally an event at (3, 2) is processed at 30 ns. The resulting array after each event is processed is shown above the kernel. The final result is the same.

FIG. 16 illustrates an example of a YAML configuration file 1600, according to some embodiments. YAML files can be a feature of the Python programming language. In some embodiments, YAML configuration file 1600 can be used to program a neuromorphic integrated circuit and initialize it to process events (or spikes) in a defined application. An event is indicated by the occurrence of a spike and may indicate a color transform in an image, an increase or decrease in a measured analog value, a change of contrast, the occurrence of specific data in a data packet, or other real-world phenomenon.

In some embodiments, the neuromorphic integrated circuit, or a software simulation thereof, is configured by YAML configuration file 1600 to process the CIFAR10 data set in a SCNN with eight distinct neural layers. The first layer (layer 1602) is configured as an input layer with a 32 by 32-bit organization to match the resolution of the data set. This layer can convert pixel information to spikes and is connected to layer 1604.

Layer 1604 is configured as a convolutional layer with tertiary synaptic weights. Layer 1604 is defined as "ConvolutionalTertiary" layer type. Weights can be pre-loaded into layer 1604 from a file called "scnn_conv2_wts.dat" that is present in a specified directory. Layer 1604 is defined to use a 'FlushingBuffer.' 'FlushingBuffer' can be defined elsewhere in YAML configuration file 1600. The spike packet size for layer 1604 is defined as 131,072 spikes. This can be equivalent to one entire frame of 32 by 32 pixels with a depth of 8. Layer 1604 is defined to have 128 outputs to the next layer (e.g., layer 1606). Layer 1604 is defined to have a convolution size of 3 by 3 pixels with pooling across a 2×2 field.

Each convolutional layer in the SCNN can be similarly configured. The last layer can be of type "FullyConnectedTernary" which indicates that the layer is a fully connected layer with tertiary synaptic weights. This last layer can have ten outputs. This can be equivalent to the ten classes that are contained in the CIFAR10 data set. The last layer can have a packet size 1024. This can be equivalent to the number of features that are returned in a previous convolutional layer.

In some embodiments, YAML configuration file 1600 can be processed during the initialization of the neuromorphic integrated circuit. A constructor task can generate a Parameters object from the parameters specified in YAML configuration file 1600. The constructor task can allocate a single layer for each parameter object in YAML configuration file 1600. Each layer can be created with its specific parameters. A data structure can be used to sequentially iterate through all layers. A buffering type object can be created and initialized for each layer in the SCNN. Each layer can be initialized and connected to previous layers through registers that are organized as a scan chain, except for the input layer, which can be connected to input signals and outputs to the next layer. During layer initialization, a connection list, a weight vector array, and a potential array are initialized. The connection list can contain information about which neuron circuits are connected. Each neuron circuit in the SCNN can have a defined number of synapses, which contain synaptic weight values. The membrane potential value of each neuron can be defined as the sum of all synapse weight vectors that are connected to that neuron circuit and are designated by a spike in a spike packet.

Figure 17:
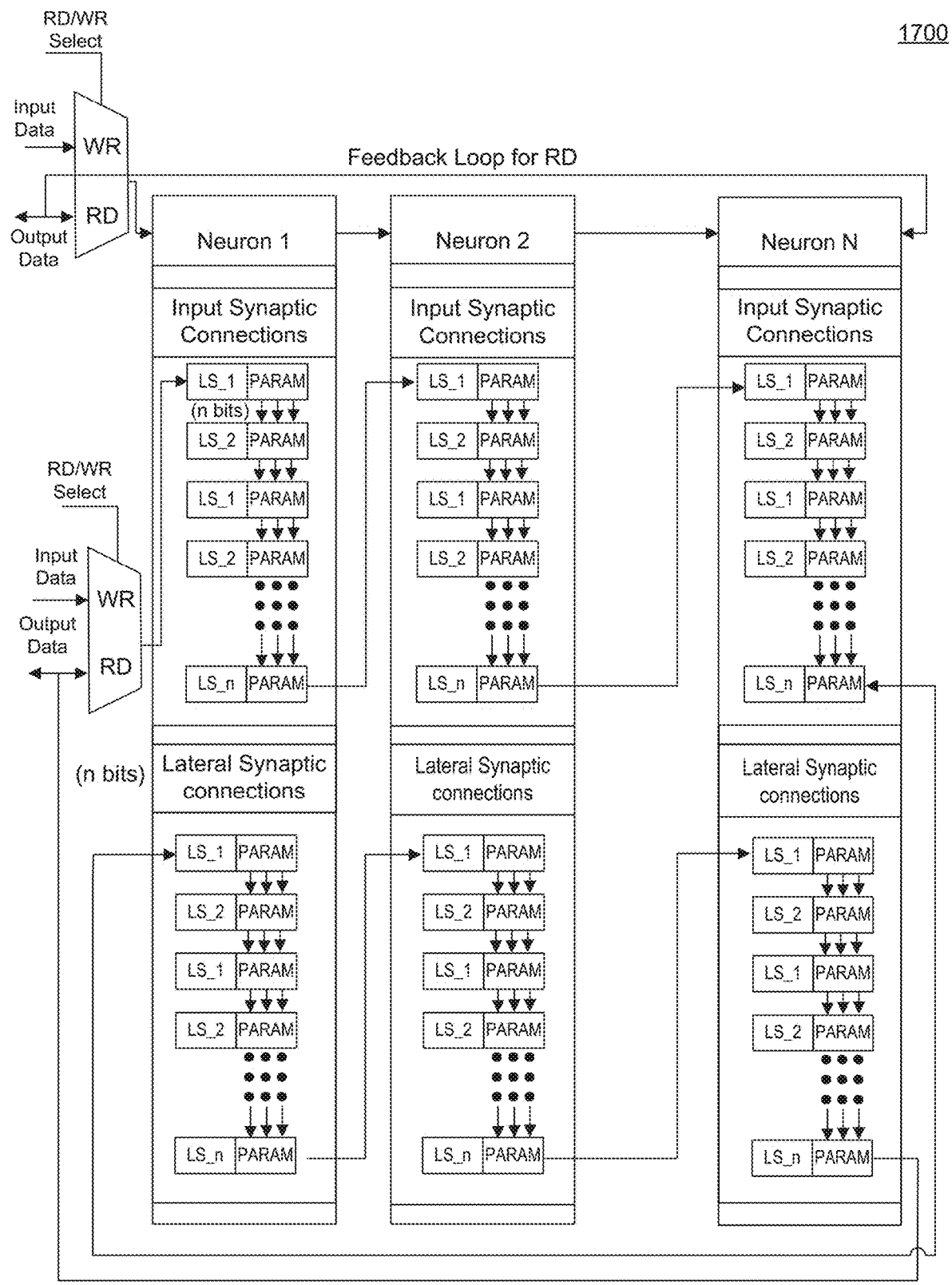
FIG. 17 illustrates configuration registers comprising a scan chain that define a configuration and connectivity of each spiking neuron circuit and each layer of spiking neuron circuits, according to some embodiments.

FIG. 17 illustrates configuration registers comprising a scan chain that define a configuration and connectivity of each neuron circuit and each layer of neurons circuits, according to some embodiments. FIG. 17 illustrates configuration registers comprising a scan chain that define a configuration and connectivity of each neuron circuit and each layer of neuron circuits, according to some embodiments. Configuration data can be sent in a sequential manner to the neural processors to construct a processing sequence.

What is claimed is:

1. A neuromorphic integrated circuit, comprising:
    a spike converter configured to generate spikes from input data;
    a spike input buffer configured to store the spikes from the spike converter;
    a neuron fabric comprising a neural processor comprising a plurality of spiking neuron circuits configured to perform a task based on the spikes and a neural network configuration;
    a memory comprising the neural network configuration, wherein the neural network configuration comprises a potential array and a plurality of synapses, the neural network configuration defines connections between the plurality of spiking neuron circuits and the plurality of synapses, the potential array comprising membrane potential values for the plurality of spiking neuron circuits, and the plurality of synapses having corresponding synaptic weights;
    a packetizer configured to generate a spike packet comprising spike bits representing the spikes in the spike input buffer, wherein each spike bit in the spike packet corresponds to a synapse in the plurality of synapses; and
    a processor configured to modify the neural network configuration based on a plurality of configuration parameters,
    wherein a spiking neuron circuit in the plurality of spiking neuron circuits is configured to:
        apply a first logical AND function to a first spike bit in the spike packet and a first synaptic weight of a first synapse corresponding to the first spike bit, wherein the first synaptic weight has a value of one, and the applying the first logical AND function outputs a logical one; and
        increment a membrane potential value associated with the spiking neuron circuit in response to the applying the first logical AND function outputting the logical one;
        apply a second logical AND function to the first spike bit in the spike packet and a second synaptic weight corresponding to the first spike bit, wherein the second synaptic weight has a negative value, and the applying the second logical AND function outputs a logical one;
        decrement the membrane potential value associated with the spiking neuron circuit in response to the applying the second logical AND function outputting the logical one.

2. The neuromorphic integrated circuit of claim 1, wherein each synaptic weight of the synaptic weights has a weight value selected from a group consisting of negative one, zero, and one.

3. The neuromorphic integrated circuit of claim 1, wherein each spike bit in the spike packet is represented using a digital bit.

4. The neuromorphic integrated circuit of claim 1, wherein the neural processor is configured to:
    select the spiking neuron circuit in the plurality of spiking neuron circuits based on the membrane potential value of the spiking neuron circuit having a highest value among the membrane potential values for the plurality of spiking neuron circuits;
    determine that the membrane potential value of the selected spiking neuron circuit reached a learning threshold value associated with the spiking neuron circuit; and
    perform a learning function based on the determination that the membrane potential value of the selected spiking neuron circuit reached the learning threshold value associated with the selected spiking neuron circuit.

5. The neuromorphic integrated circuit of claim 4, wherein to perform the learning function, the neural processor is configured to:
    determine a first spike bit in the spike packet represents an unused spike, wherein the first spike bit corresponds to a first synapse in the plurality of synapses, the first spike bit has a value of one, and a first synaptic weight of the first synapse has a value of zero;
    determine a second synaptic weight of a second synapse in the plurality of synapses is an unused synaptic weight, wherein the second synaptic weight corresponds to a second spike bit in the spike packet, the second synaptic weight has a value of one, and the second spike bit in the spike packet has a value of zero;
    swapping a value of the second synaptic weight with a value of the first spike.

6. The neuromorphic integrated circuit of claim 1, wherein a spiking neuron circuit in the plurality of spiking neuron circuits is configured to:
    determine that the membrane potential value associated with the spiking neuron circuit reached a spiking threshold value of the spiking neuron circuit; and
    generate an output spike based on the determination that the membrane potential value of the spiking neuron circuit reached the spiking threshold value.

7. The neuromorphic integrated circuit of claim 1, wherein the neuron fabric is configured to perform the task using a convolution operation.

8. The neuromorphic integrated circuit of claim 1, wherein to modify the neural network configuration, the processor is configured to modify the connections between the plurality of spiking neuron circuits and the plurality of synapses based on the plurality of configuration parameters.

9. The neuromorphic integrated circuit of claim 1, wherein the input data comprises pixel data, audio data, or sensory data.

10. The neuromorphic integrated circuit of claim 1, further comprising a plurality of sensor interfaces.

11. A method, comprising:
receiving, at a spiking neuron circuit, a set of spike bits corresponding to a set synapses associated with the spiking neuron circuit;
applying, at the spiking neuron circuit, a first logical AND function to a first spike bit in the set of spike bits and a first synaptic weight of a first synapse in the set of synapses, wherein the first synapse corresponds to the first spike bit;
incrementing, at the spiking neuron circuit, a membrane potential value associated with the spiking neuron circuit based on the applying;
applying, at the spiking neuron circuit, a second logical AND function to the first spike bit in the set of spike bits and a second synaptic weight of a second synapse in the set of synapses, wherein the second synapse corresponds to the first spike bit, the second synaptic weight has a value of negative one, and the applying the second logical AND function outputs a logical one; and
decrementing, at the spiking neuron circuit, the membrane potential value associated with the spiking neuron circuit in response to the applying the second logical AND function outputting the logical one.

12. The method of claim 11, wherein the set of spike bits represents input data comprising pixel data, audio data, or sensory data.

13. The method of claim 11, further comprising:
selecting, by a neural processor, the spiking neuron circuit from a plurality of spiking neuron circuits based on the membrane potential value of the spiking neuron circuit having a highest value among membrane potential values for the plurality of spiking neuron circuits.

14. The method of claim 11, further comprising:
determining, at a neural processor, that the membrane potential value associated with the spiking neuron circuit reached a learning threshold value associated with the spiking neuron circuit; and
performing, at the neural processor, a learning function based on the determination that the membrane potential value associated with the spiking neuron circuit reached the learning threshold value associated with the spiking neuron circuit.

* * * * *